US012455303B2

(12) United States Patent
Kagaya

(10) Patent No.: US 12,455,303 B2
(45) Date of Patent: Oct. 28, 2025

(54) NEGATIVE VOLTAGE MONITORING CIRCUIT AND LIGHT RECEIVING DEVICE

(71) Applicant: Sony Semiconductor Solutions Corporation, Kanagawa (JP)

(72) Inventor: Tsukasa Kagaya, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 101 days.

(21) Appl. No.: 18/570,897

(22) PCT Filed: Mar. 16, 2022

(86) PCT No.: PCT/JP2022/011896
§ 371 (c)(1),
(2) Date: Dec. 15, 2023

(87) PCT Pub. No.: WO2023/013139
PCT Pub. Date: Feb. 9, 2023

(65) Prior Publication Data
US 2024/0219434 A1    Jul. 4, 2024

(30) Foreign Application Priority Data
Aug. 3, 2021  (JP) .................. 2021-127609

(51) Int. Cl.
*G01R 19/10*     (2006.01)
*G01R 19/165*    (2006.01)
(Continued)

(52) U.S. Cl.
CPC ....... *G01R 19/10* (2013.01); *G01R 19/16533* (2013.01); *G01S 7/4863* (2013.01); *G01S 7/497* (2013.01); *G01S 17/931* (2020.01)

(58) Field of Classification Search
CPC . G01R 19/10; G01R 19/165; G01R 19/16523
(Continued)

(56) References Cited

U.S. PATENT DOCUMENTS 6,313,459 B1    11/2001  Hoffe
6,430,403 B1 *   8/2002  Kossor ............... H03F 3/24
                                              455/259

FOREIGN PATENT DOCUMENTS

CN    105588974 B    6/2018
JP    H01223360 A    9/1989
(Continued)

OTHER PUBLICATIONS

International Search Report (PCT/ISA/210), International Application No. PCT/JP2022/011896, dated May 31, 2022.

*Primary Examiner* — Roberto Velez
(74) *Attorney, Agent, or Firm* — Michael Best & Friedrich LLP

(57) ABSTRACT

[Problem] To implement a negative voltage monitoring circuit with high accuracy.
[Solution] A negative voltage monitoring circuit includes a first voltage-dividing circuit, a first amplifier circuit, a second amplifier circuit, and an error determination circuit. The first voltage-dividing circuit divides a power supply voltage and outputs a first voltage. The first amplifier circuit is configured such that the first voltage is inputted to a noninverting input terminal and an output voltage is subjected to negative feedback. The second amplifier circuit is configured such that a second voltage is inputted to the noninverting input terminal, the second voltage being obtained by dividing a potential difference between the power supply voltage and a voltage to be monitored, the voltage being applied to an anode of a light receiving element, and an output voltage is subjected to negative feedback. The error determination circuit outputs an error signal on the basis of a difference between the output of the first amplifier circuit and the output of the second amplifier circuit.

17 Claims, 15 Drawing Sheets

(51) Int. Cl.
    *G01S 7/4863*     (2020.01)
    *G01S 7/497*     (2006.01)
    *G01S 17/931*     (2020.01)

(58) Field of Classification Search
    USPC .................................................. 324/123 C
    See application file for complete search history.

(56) References Cited

FOREIGN PATENT DOCUMENTS

| | | |
|---|---|---|
| JP | 2006041628 A | 2/2006 |
| JP | 2009236711 A | 10/2009 |
| JP | 2009253830 A | 10/2009 |
| JP | 2013059240 A | 3/2013 |
| JP | 2014029293 A | 2/2014 |
| JP | 2020112495 A | 7/2020 |

* cited by examiner

NEGATIVE VOLTAGE MONITORING CIRCUIT AND LIGHT RECEIVING DEVICE

TECHNICAL FIELD

The present disclosure relates to a negative voltage monitoring circuit and a light receiving device.

BACKGROUND ART

In order to generate avalanche amplification with high sensitivity, a SPAD (Single Photon Avalanche Diode) used for a ToF (Time of Flight) sensor requires the application of a large negative voltage voltage, e.g., −20 V to the anode side. ToF sensors are installed in various cabinets depending upon the purpose. For example, when a ToF sensor is installed in an automobile or the like, the power supply voltage of the sensor is monitored with high accuracy as functional safety. During the monitoring, a voltage cannot be directly read in the sensor due to the problems of the withstand voltage of the device. Thus, the voltage needs to be inputted to the sensor after being converted into a positive voltage by dividing a positive reference voltage by using a high voltage resistor mounted outside.

However, such mounting is affected by variations in the voltage value of a positive voltage and a dominant gain error of a voltage division ratio is caused by variations in external resistance, so that the accuracy of monitoring cannot be sufficiently obtained. Alternatively, an external resistor with very high precision needs to be mounted to solve the problem. Such a configuration may increase the cost.

CITATION LIST

Patent Literature

[PTL 1]
  JP H01-223360 A

SUMMARY

Technical Problem

The present disclosure proposes a negative voltage monitoring circuit with high accuracy.

Solution to Problem

According to an embodiment, a negative voltage monitoring circuit includes a first voltage-dividing circuit, a first amplifier circuit, a second amplifier circuit, and an error determination circuit. The first voltage-dividing circuit divides a power supply voltage and outputs a first voltage. The first amplifier circuit is configured such that the first voltage is inputted to a noninverting input terminal and an output voltage is subjected to negative feedback. The second amplifier circuit is configured such that a second voltage is inputted to the noninverting input terminal, the second voltage being obtained by dividing a potential difference between the power supply voltage and a voltage to be monitored, the voltage being applied to an anode of a light receiving element, and an output voltage is subjected to negative feedback. The error determination circuit outputs an error signal on the basis of a difference between the output of the first amplifier circuit and the output of the second amplifier circuit.

The light receiving element may be a SPAD (Single Photon Avalanche Diode).

A negative voltage may be applied to the anode of the light receiving element in a light receiving state.

The negative voltage monitoring circuit may further include an error detection circuit that acquires a potential difference between the first amplifier circuit and the second amplifier circuit in a state in which a negative voltage is not applied to the anode of the light receiving element.

The negative voltage monitoring circuit may further include a voltage-division-ratio control circuit that controls the voltage division ratio of the first voltage-dividing circuit on the basis of the output of the error detection circuit.

The voltage-division ratio control circuit may output the controlled voltage division ratio to the error determination circuit.

The error determination circuit may compare a voltage obtained by amplifying, by the amplification factor of the first amplifier circuit, a voltage determined by dividing the power supply voltage according to the voltage division ratio controlled by the voltage-division-ratio control circuit, a voltage obtained by amplifying, by the amplification factor of the second amplifier circuit, a voltage determined by dividing the power supply voltage and a predetermined negative voltage, and a voltage outputted from the second amplifier circuit, and make an error determination.

The error detection circuit may output binary information obtained by comparing the output of the first amplifier circuit and the output of the second amplifier circuit, and the voltage-division-ratio control circuit may control the voltage division ratio on the basis of the binary information.

The voltage-division-ratio control circuit may control the resistance value of the first voltage-dividing circuit to control the voltage division ratio.

The error detection circuit may output binary information obtained by comparing the result of converting the output of the first amplifier circuit into a digital signal and the result of converting the output of the second amplifier circuit into a digital signal, and the voltage-division-ratio control circuit may control the voltage division ratio on the basis of the binary information.

The voltage-division-ratio control circuit may control the resistance value of the first voltage-dividing circuit to control the voltage division ratio.

The negative voltage monitoring circuit may further include a second voltage-dividing circuit that divides a potential difference between the power supply voltage and the voltage to be monitored and outputs the second voltage.

Two systems of the first voltage-dividing circuit, the first amplifier circuit, and the second amplifier circuit may be provided.

According to an embodiment, a light receiving device includes the negative voltage monitoring circuit according to any one of the foregoing descriptions, and a second voltage-dividing circuit that divides a potential difference between the power supply voltage and a terminal to which a negative voltage is to be applied and outputs a second voltage, wherein the negative voltage monitoring circuit performs controls such that the voltage division ratio of the first voltage-dividing circuit is equal to the voltage division ratio of the second voltage-dividing circuit in a state in which a negative voltage is not applied.

The light receiving device may further include a negative voltage generating circuit that generates a negative voltage and applies, in a light receiving state, the generated negative voltage to the terminal to which the negative voltage is to be applied.

The error determination circuit may output the error signal if a voltage obtained by dividing the power supply voltage and the voltage generated by the negative voltage generating circuit does not fall within a predetermined voltage range.

DESCRIPTION OF EMBODIMENTS

Embodiments of the present disclosure will be described below with reference to the accompanying drawings. The drawings are used for the description and do not always agree with the shapes and sizes of the configurations of units in an actual device or size ratios or the like relative to other configurations in the actual device. Since the drawings are simplified, configurations that are not illustrated but are necessary for implementation are to be properly provided.

Figure 1:
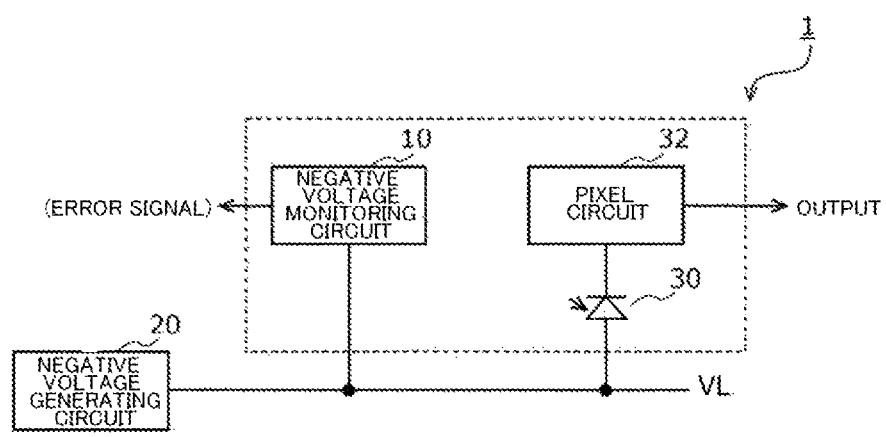
FIG. 1 illustrates a configuration example of a light receiving element according to one embodiment.

FIG. 1 is a schematic diagram of a light receiving device that receives light by using a negative voltage monitored by a negative voltage monitoring circuit according to the present disclosure.

A light receiving device 1 includes a negative voltage monitoring circuit 10, a negative voltage generating circuit 20, a light receiving element 30, and a pixel circuit 32. The light receiving device 1 is a device that is provided in, for example, a ToF (Time of Flight) sensor, converts an analog signal received by the light receiving element 30 into a digital signal, and outputs the digital signal.

FIG. 1 is a schematic diagram in which a detailed illustration of other elements capable of performing the functions of the light receiving device 1 is omitted. Circuits or the like for properly receiving light and outputting signals may be provided as appropriate. For example, a second voltage-dividing circuit, which is not illustrated and will be described later, may be provided between the negative voltage generating circuit 20 and the negative voltage monitoring circuit 10 and outside a chip to which the negative voltage monitoring circuit 10 belongs.

The negative voltage monitoring circuit 10 determines whether a negative voltage applied to the light receiving element 30 in the light receiving device 1 falls within a predetermined voltage range. If the negative voltage does not fall within the predetermined voltage range, the negative voltage monitoring circuit 10 outputs an error signal and produces an output to inform other elements of the light receiving device 1 that the voltage has not been normally applied.

The negative voltage generating circuit 20 is a circuit for generating a negative voltage to be applied to an anode of the light receiving element 30. The configuration of the negative voltage generating circuit 20 is not particularly limited. Any circuit capable of generating a proper negative voltage may be used.

The light receiving element 30 may be, for example, a photodiode, more specifically, an APD (Avalanche Photodiode) or a SPAD (Single Photon Avalanche Diode). For example, the light receiving device 1 forms a light receiving pixel array, in which the light receiving elements 30 are placed in a two-dimensional array, and receives light in the light receiving pixel array. The light receiving pixel array operates as, for example, the light receiving area of an SiPM (Silicon Photomultiplier). In order to obtain a proper avalanche amplification when photons enter in a light receiving state, a SPAD or the like needs a high negative voltage applied to the anode.

The pixel circuit 32 is a circuit that properly converts an analog signal outputted from the light receiving element 30 into a digital signal and outputs the digital signal. The pixel circuit 32 may be any circuit capable of properly converting a signal outputted from the light receiving element 30 and outputting the signal.

As a non-limiting example, the negative voltage monitoring circuit 10, the light receiving element 30, and the pixel circuit 32 are provided in the same chip. For example, a part surrounded by a dotted line in FIG. 1 is present in the same chip.

The negative voltage generating circuit 20 generates a high negative voltage to be applied to the light receiving element 30. The negative voltage is applied to the anode of the light receiving element 30. Such a voltage having a high absolute value needs to be monitored in view of functional safety. The negative voltage monitoring circuit 10 is a circuit for monitoring the voltage. An element that receives such a high negative voltage needs to withstand a high voltage.

In many cases, it is difficult to form such an element capable of withstanding a high voltage in the chip including the light receiving device 1. Thus, a negative voltage properly divided outside the chip is inputted to the negative voltage monitoring circuit 10. By monitoring the divided negative voltage, the negative voltage monitoring circuit 10 monitors a voltage applied to the anode of the light receiving element 30.

First Embodiment

Figure 2:
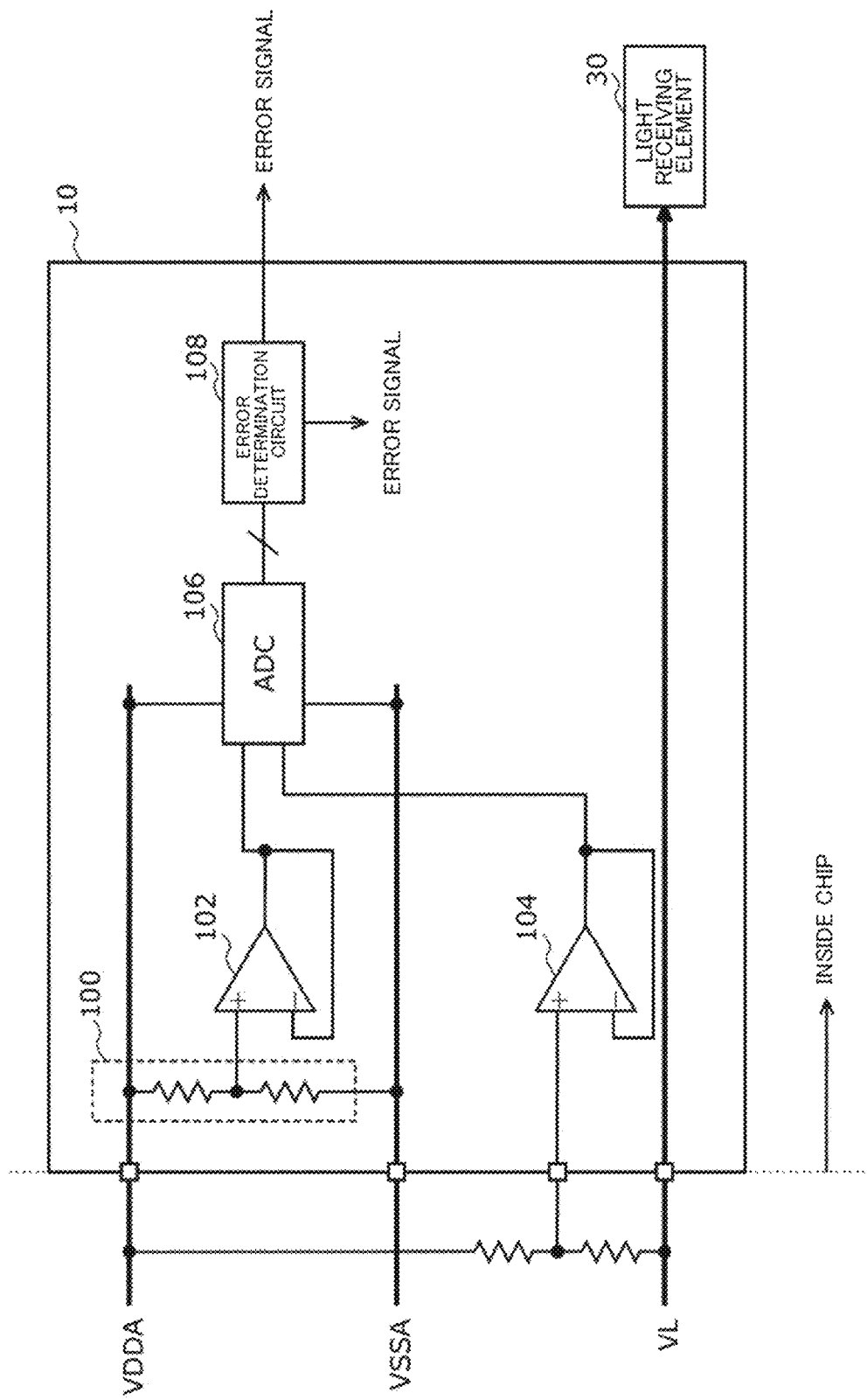
FIG. 2 is a schematic diagram of the configuration of a negative voltage monitoring circuit according to one embodiment.

FIG. 2 is a schematic diagram illustrating an example of the configuration of a negative voltage monitoring circuit 10 according to an embodiment. In FIG. 2, the right side of a dotted line indicates the inside of a chip and the left side of the dotted line indicates the outside of the chip. It is assumed that a power supply voltage is properly connected also in an unshown range.

For example, each amplifier circuit is properly connected to power supply voltages VDDA and VSSA. For example, VDDA may be a voltage of about 3.6 [V] and VSSA may be about 0 [V] (ground voltage). VL is a high negative voltage of about −20 [V] when the light receiving element 30 is placed in a light receiving state. In a state other than the light receiving state, VL may be 0 [V] (ground voltage). In the following drawing, the power supply voltage VSSA is set from the outside via a terminal. The setting is not limited thereto. The power supply voltage VSSA may be a voltage set as a ground voltage in a chip by, for example, proper earthing without being set via a terminal.

The negative voltage monitoring circuit 10 includes a first voltage-dividing circuit 100, a first amplifier circuit 102, a second amplifier circuit 104, an analog-digital converter circuit (hereinafter will be referred to as an Analog to Digital Converter: ADC 106), and an error determination circuit 108. The negative voltage monitoring circuit 10 properly divides, with respect to the power supply voltage, a negative voltage to be applied to the anode of the light receiving element 30 and converts the divided voltage into a positive voltage. The negative voltage monitoring circuit 10 is a circuit that determines whether the positive voltage falls within a predetermined voltage range, and outputs an error signal in the event of an anomaly.

The first voltage-dividing circuit 100 outputs a first voltage obtained by dividing the power supply voltages VDDA and VSSA. For example, the first voltage-dividing circuit 100 includes a plurality of resistors and outputs a voltage from a node between the plurality of resistors.

The first amplifier circuit 102 has a noninverting input terminal connected to the output of the first voltage dividing circuit 100 and the inverting input terminal connected to the output terminal of the first amplifier circuit 102. In other words, the output voltage of the first amplifier circuit 102 is subjected to negative feedback, and the first voltage is amplified with a predetermined amplification factor and is outputted by the first amplifier circuit 102.

The second amplifier circuit 104 has the noninverting input terminal connected to a second voltage obtained by dividing, by an external voltage-dividing circuit with a predetermined voltage division ratio, the power supply voltage VDDA and the voltage VL applied to the anode of the light receiving element, and has the inverting input terminal connected to the output terminal of the second amplifier circuit 104. In other words, the output voltage of the second amplifier circuit 104 is subjected to negative feedback, and the second voltage is amplified with a predetermined amplification factor and is outputted by the second amplifier circuit 104. The voltage VL is a voltage to be monitored in the present disclosure and is a negative voltage in a state in which the light receiving element 30 can receive light.

The second amplifier circuit 104 desirably has the same amplification factor as the first amplifier circuit 102. In the case of different amplification factors, the ADC 106 at the destination may be configured to control a digital signal on the basis of the amplification factor or the error determination circuit 108 may be configured to determine an error on the basis of the amplification factor.

The ADC 106 is a circuit that converts an inputted analog signal into a digital signal and outputs the digital signal. Divided voltages as analog signals outputted from the first amplifier circuit 102 and the second amplifier circuit 104 are inputted to the ADC 106 and are converted into digital signals. For example, the ADC 106 multiplexes these signals and outputs the multiplexed signal to the error determination circuit 108. The ADC 106 may convert the reference value of the inputted voltage into a power supply voltage in a chip and output the voltage. In this case, the ADC 106 may include a BGR (Band Gap Reference) that receives VDDB and VSSB as power supply voltages in the chip and outputs the voltage values or may include a level shifter as necessary. Such a configuration can be also shared with the configuration of a thermometer or the like in the chip.

The error determination circuit 108 makes an error determination on the basis of the digital signal outputted from the ADC 106 and outputs the determination. The error determination circuit 108 outputs the error signal when an error occurs in, for example, a module including an integrated register in the chip or a necessary module outside the chip.

The error determination circuit 108 determines whether a voltage applied to the noninverting input terminal of the second amplifier circuit 104 falls within a predetermined range on the basis of, for example, a voltage difference between the first amplifier circuit 102 and the second amplifier circuit 104, the voltage difference being outputted from the ADC 106. The negative voltage monitoring circuit 10 may include an error detection circuit, which is not illustrated, in or outside the error determination circuit 108, and the error detection circuit may detect a voltage difference between the first amplifier circuit 102 and the second amplifier circuit 104. More specifically, in a light receiving state, a voltage outputted from the second amplifier circuit 104 is subtracted from a voltage outputted from the first amplifier circuit 102, and it is determined that whether the voltage difference falls within the predetermined range. Within the predetermined range, the error signal is not outputted on the assumption that a normal voltage is applied. Outside the predetermined range, the error signal is outputted on the assumption that an abnormal voltage is applied.

As preprocessing, the error determination circuit 108 compares the second voltage outputted from the voltage-dividing circuit provided outside and the first voltage outputted from the first voltage-dividing circuit 100, before a negative voltage is applied to VL prior to a transition to a light receiving state. The second voltage in this configuration is outputted from the voltage-dividing circuit provided outside the chip. The voltage dividing circuit provided outside the chip is mounted independently of the fabrication of the chip by a chip assembly maker. Even in a design with the same voltage division ratio as the first voltage-dividing circuit 100, a deviation may be made from the voltage division ratio. Thus, the influence of a difference in voltage division ratio is obtained by the preprocessing, and the influence of a deviation of the voltage division ratio is reflected in the generation of the error signal.

As preprocessing, the error determination circuit 108 compares the output of the first amplifier circuit 102 and the output of the second amplifier circuit 104 while the same voltage as the voltage of VSSA is applied as the voltage of VL. In an ideal state, a difference between the outputs is 0. If a difference between the outputs is not 0, the difference between the outputs is stored as an offset voltage.

The error determination circuit 108 updates a value by, for example, subtracting the offset voltage from the output voltage of the ADC 106 after a negative voltage is applied to VL.

Thereafter, whether the negative voltage applied to VL is normal value or not is determined from the timing of a transition of the light receiving element 30 to a light receiving state after the application of the negative voltage to VL, and the error signal is generated and outputted on the basis of the determination result.

The constituent elements of the light receiving device provided in or outside the chip may perform the processing of an abnormal time on the basis of the error signal. For example, if the negative voltage applied to VL is too high, the application of the negative voltage may be stopped. For example, if the negative voltage applied to VL is too low, the voltage of the negative voltage may be increased. It should be noted that the processing is described as an example. Processing to be performed in the event of an error is not limited thereto.

As described above, without providing elements such as a high voltage resistor in the chip, the negative voltage monitoring circuit 10 according to the present embodiment can properly determine whether a proper negative voltage is applied to the anode of the light receiving element 30.

Figure 3:
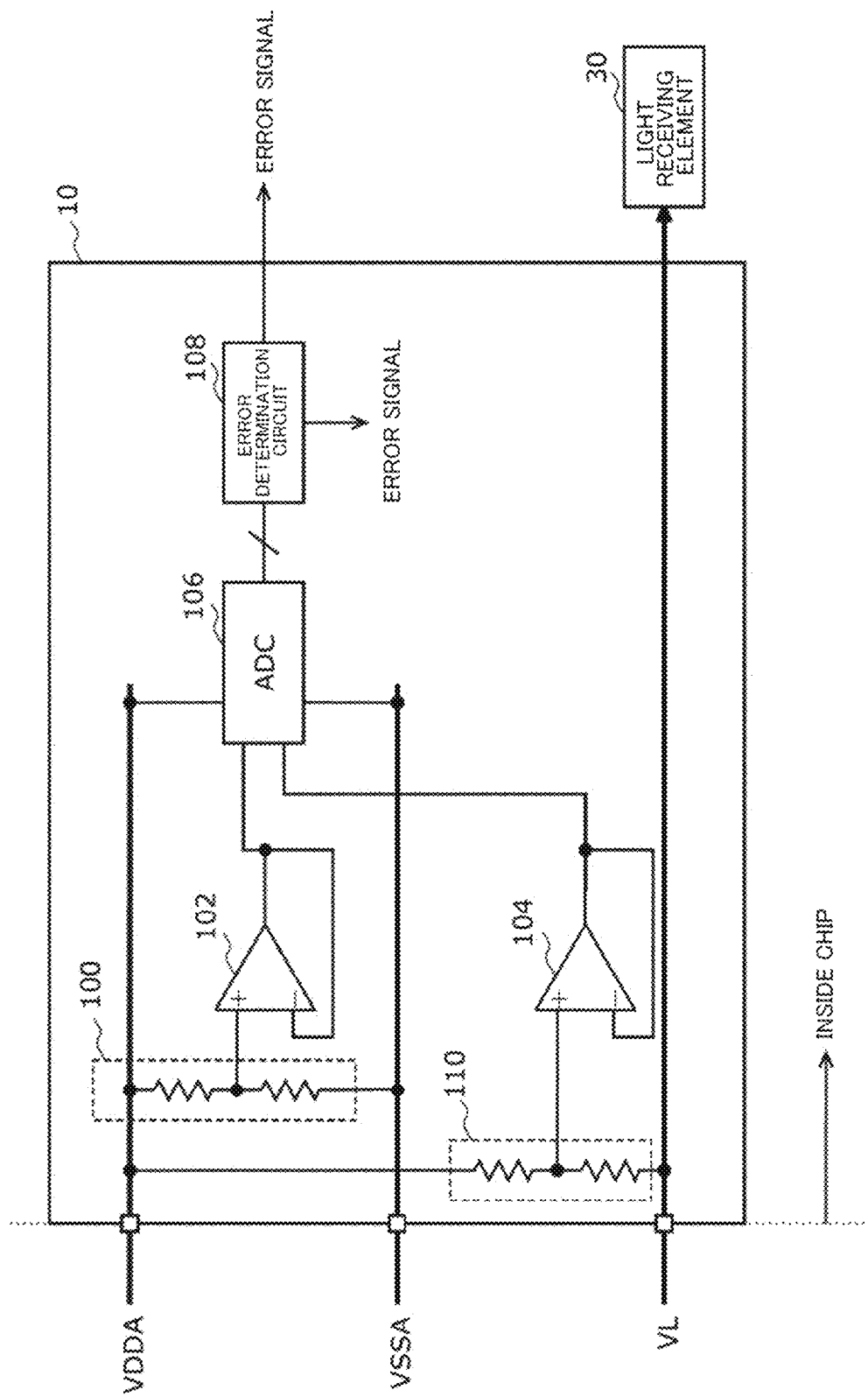
FIG. 3 is a schematic diagram of the configuration of a negative voltage monitoring circuit according to one embodiment.

FIG. 3 illustrates the configuration of the negative voltage monitoring circuit 10 according to a modification example. In the modification example, elements such as a high-voltage resistor are provided in a chip. As illustrated in FIG. 3, if a high-voltage resistor allowable in the chip can be provided, a second voltage-dividing circuit 110 that divides VDDA and VL may be provided in the chip.

The second voltage-dividing circuit 110 is provided in the negative voltage monitoring circuit 10 to divide VDDA and VL with a predetermined voltage division ratio and output VDDA and VL. The error determination circuit 108 subtracts an offset voltage from the output voltage of the ADC 106. On the basis of the subtraction result and a predetermined voltage range, the error determination circuit 108 determines whether a negative voltage falls within a normal range when the negative voltage is applied to VL. The error determination circuit 108 then outputs an error signal if necessary.

If the following embodiments have room for the provision of a high-voltage resistor or the like in a chip, the negative voltage monitoring circuit 10 may be configured with the second voltage-dividing circuit 110 as illustrated in FIG. 3.

Second Embodiment

A second embodiment describes a negative voltage monitoring circuit that controls the voltage division ratio of a first voltage-dividing circuit 100 in a chip in a state in which a negative voltage is not applied, and achieves error detection by using the controlled voltage division ratio.

Figure 4:
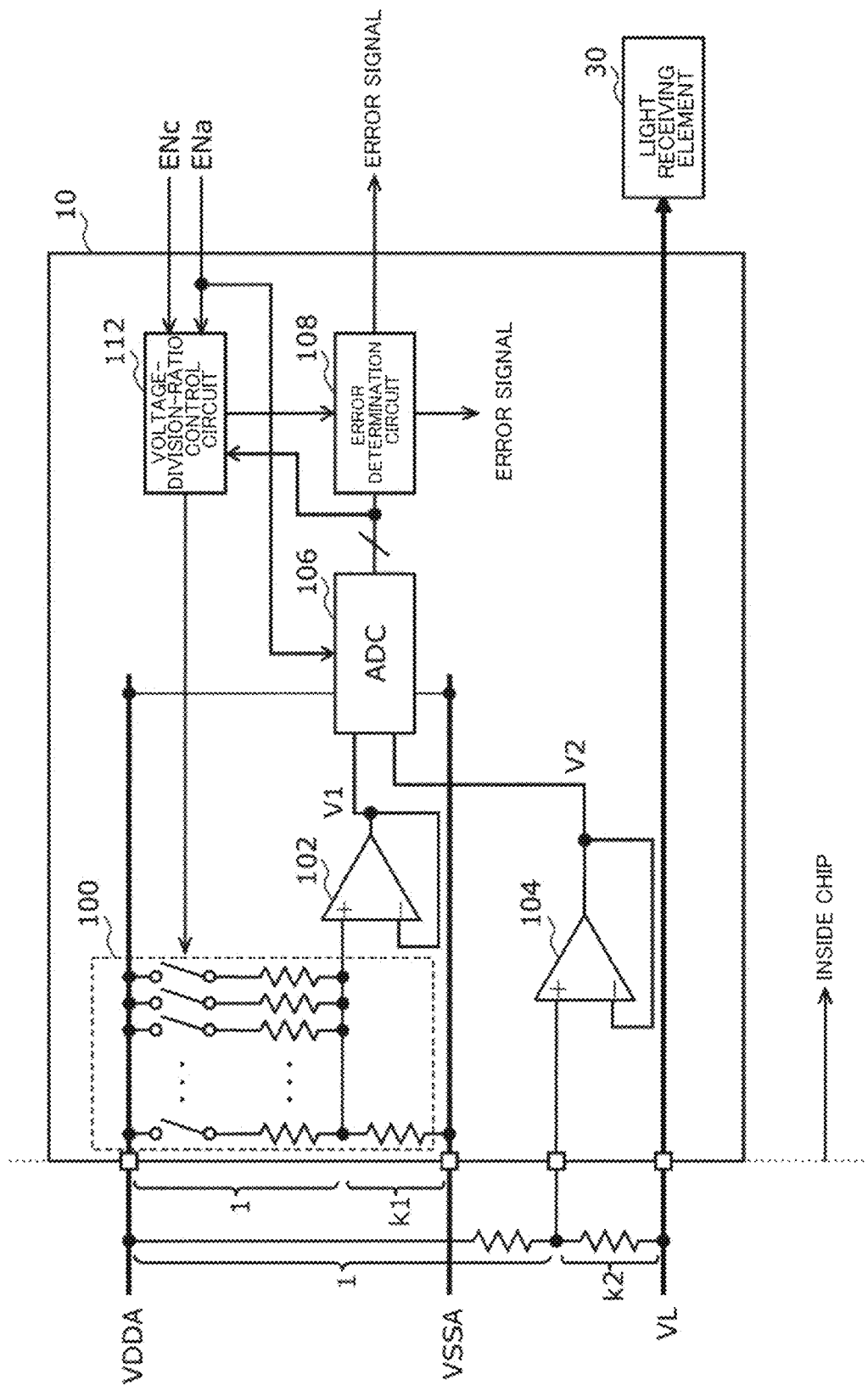
FIG. 4 is a schematic diagram of the configuration of a negative voltage monitoring circuit according to one embodiment.

FIG. 4 is a circuit diagram schematically illustrating a negative voltage monitoring circuit 10 according to the present embodiment. The negative voltage monitoring circuit 10 further includes a voltage-division-ratio control circuit 112 in addition to the configuration of FIG. 2. Constituent elements denoted by the same reference numerals perform the same operations as in FIG. 2 or the like unless otherwise specified, and thus a detailed description thereof is omitted. The same applies to a third embodiment, which will be describe later.

For example, the first voltage dividing circuit 100 may be configured with a plurality of resistors while one of the resistors to be subjected to voltage division is connected in parallel, or may be configured as a voltage-dividing circuit that can change a voltage division ratio by controlling the state of connection with a switch.

A voltage-division-ratio control circuit 112 is a circuit that generates a signal for controlling the voltage division ratio of the first voltage-dividing circuit 100 and outputs the signal to the first voltage-dividing circuit 100, the signal being generated on the basis of an amplified first voltage and an amplified second voltage that are outputted from an ADC 106. The voltage-division-ratio control circuit 112 receives an enable signal Enc for turning on/off a calibration function and a pulse signal ENa for turning on the ADC 106, and outputs a signal for controlling the voltage division ratio on the basis of the timing of the input of the signal. In other words, while ENc is turned on, the voltage-division-ratio control circuit 112 is placed in a state where the voltage division ratio of the first voltage-dividing circuit 100 can be controlled to perform calibration. While ENc is turned off, for example, the operation of the voltage-division-ratio control circuit 112 may be stopped and placed in a state where at least an operation for controlling the voltage division ratio of the first voltage-dividing circuit 100 is not performed.

The first voltage-dividing circuit 100 changes a resistance value according to a control signal outputted from the voltage-division-ratio control circuit 112 and controls the voltage division ratio of an external voltage dividing circuit for outputting a second voltage and the voltage division ratio of the first voltage-dividing circuit to an equal voltage division ratio. The voltage-division-ratio control circuit 112 outputs, for example, a signal for controlling a switch that connects the resistors provided in parallel in the first voltage-dividing circuit 100 and a power supply voltage.

Figure 5:
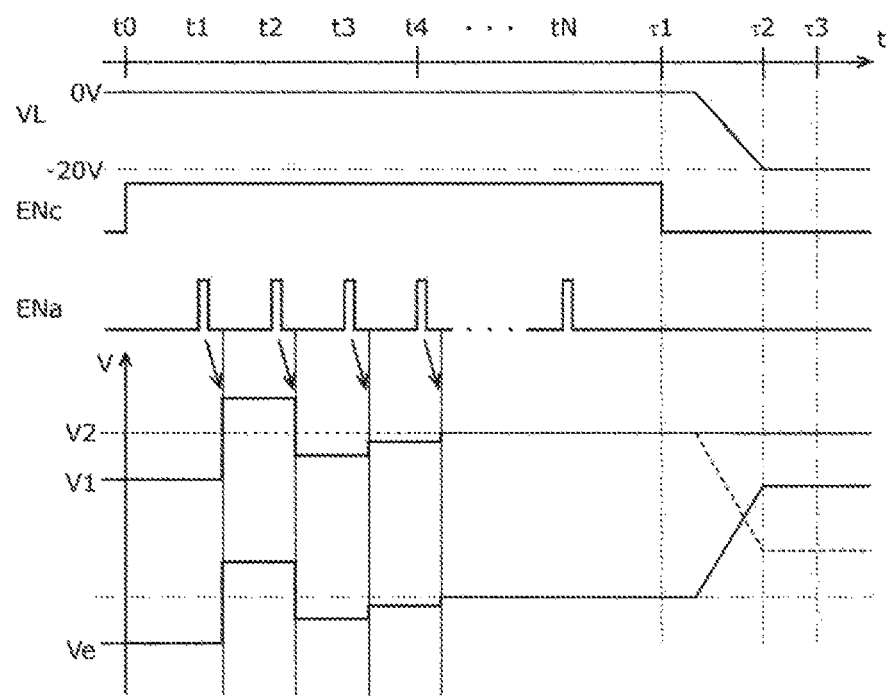
FIG. 5 is a timing chart for controlling the voltage division ratio of a first voltage-dividing circuit according to one embodiment.

FIG. 5 is a timing chart showing a transition of a voltage value by the operation of the voltage-division-ratio control circuit 112 according to one embodiment. Voltages V1, V2, and Ve in the timing chart respectively indicate the output voltage of a first amplifier circuit 102, the output voltage of a second amplifier circuit 104, and a voltage obtained by subtracting the output of the second amplifier circuit 104 from the output of the first amplifier circuit 102. Moreover, VL indicates a voltage to be monitored and applied to the anode of a light receiving element 30, and ENc and ENa respectively indicate the enable signal for turning on/off the calibration function and an enable signal for turning on the ADC 106 as described above.

First, at time t0, the enable signal ENc for turning on the calibration function is inputted. The ENc is placed in an on-state until the setting of the resistance value of the first voltage-dividing circuit 100 is completed. For example, the voltage division ratio of the first voltage-dividing circuit 100 is determined depending upon whether the resistors connected in parallel in FIG. 4 and a power supply are to be connected to each other. A binary search for the connection determines a final voltage division ratio. The ENc is kept in an on-state until a time when a binary search for a switch to be controlled in the first voltage-dividing circuit 100 is fully completed. When the ENc is placed in an on-state, for example, the voltage VL is kept in a short-circuited state from the VSSA, that is, in a state in which a negative voltage is not applied to the VL.

In this state, the voltage-division-ratio control circuit 112 controls a switch for the voltage division ratio of the first voltage-dividing circuit 100 on the basis of the enable signal ENa issued at the time of execution of AD conversion. For example, ENa is inputted as a pulse signal at predetermined times t1, t2, t3, . . . , tn. The ADC 106 performs AD conversion on the basis of the signal. In the present embodiment, ENa is also inputted to the voltage-division-ratio control circuit 112, and the voltage-division-ratio control circuit 112 acquires the voltage values of V1 and V2 and the voltage value of Ve from V1 and V2 on the basis of the timing.

The voltage-division-ratio control circuit 112 may include an error detection circuit for acquiring a difference in voltage. The error detection circuit is not illustrated. By calculating a difference between a digital signal indicating the voltage of V2 outputted from the ADC 106 and a digital signal indicating the voltage of V1, the error detection circuit acquires the value of Ve as below.

By using 1:k1 that is the voltage division ratio of the first voltage-dividing circuit 100 and 1:k2 that is the voltage division ratio of a voltage inputted to the second amplifier circuit 104, Ve can be expressed as follows: It is assumed that VDDA is a positive voltage and VSSA is a ground voltage. VL is assumed to be a ground voltage or a negative voltage. A is an amplification factor in each amplifier circuit.

[Math. 1]

$$Ve = A(V2 - V1) = \qquad (1)$$
$$A\left(VDDA \times \frac{k2}{1+k2} + |VL| \times \frac{1}{1+k2}\right) - A\left(VDDA \times \frac{k1}{1+k1}\right)$$

In expression (1), k1 is the same ratio as k2. Thus, when VL becomes a negative voltage, the first term of V2 and V1 cancel each other out, so that a positive voltage corresponding to the voltage division ratio can be obtained as Ve. In order to control the voltage division ratio of the first voltage-dividing circuit 100 under such circumstances, the voltage-division-ratio control circuit 112 performs the following processing:

The voltage-division-ratio control circuit 112 terminates the control of the voltage division ratio when V1=V2, that is, Ve=0 is obtained.

In the case of V1<V2, that is Ve<0, the voltage-division-ratio control circuit 112 performs control to reduce a difference between V1 and V2 such that V1 is raised by increasing switches for turn-off in the first voltage-dividing circuit 100.

In the case of V1>V2, that is Ve>0, the voltage-division-ratio control circuit 112 performs control to reduce a difference between V1 and V2 such that V1 is reduced by increasing switches for turn-on in the first voltage-dividing circuit 100.

In the initial state, the first voltage-dividing circuit 100 may have a half of the switches in an on-state and the other half of the switches in an off-state. The initial state is not limited thereto. An on/off state may be determined as the initial state by a combination of any of the switches. Moreover, as resistors with connections to be turned on/off by switches, elements having the same resistance value may be used. Another example may be a combination of resistors having any resistance value. A plurality of resistance values can be expressed depending upon the combination.

In this case, in the example of FIG. 5, V1<V2 is obtained at time t1. Thus, the voltage-division-ratio control circuit 112 increases a voltage division ratio on the positive side by turning on a half n/2 of n switches currently placed in an off-state (if n is an odd number, (n+1)/2 or (2−1)/2 may be selected, and the same applies hereinafter), thereby increasing V1.

Since V1>V2 is obtained at time t2, the voltage-division-ratio control circuit 112 reduces a voltage division ratio on the positive side by turning off a half n/2 of n switches currently placed in an on-state, thereby reducing V1.

This operation is continued until Ve=0 is obtained. If the number of controllable switches is M, a steady state can be obtained by M/2 repetitions at most. Thus, N in FIG. 5 may be determined as M/2. Hence, the number of calibrations may be determined as a predetermined number of times, and then the voltage division ratio may be calibrated by the voltage-division-ratio control circuit 112 until AD conversion is completed for the predetermined number of times. As another example of implementation, the foregoing operation may be repeated until the absolute value of Ve falls below a predetermined voltage. In this way, the voltage-division-ratio control circuit 112 properly changes the voltage division ratio by controlling the resistance value of the first voltage-dividing circuit 100.

As shown in FIG. 4, when the first voltage-dividing circuit 100 has a voltage division ratio of 1:k1, the voltage division ratio between external VDDA and VL is 1:k2, and VL=VSSA is obtained, the voltage-division-ratio control circuit 112 controls the voltage division ratio of the first voltage-dividing circuit 100 such that V1 is an equal potential with respect to V2 and controls these voltage division ratios to an equal ratio (e.g., 1:k to 1:k2).

After the completion of the control of the voltage division ratio by the first voltage-dividing circuit 100, ENc is changed at time τ1 to a state in which calibration is not performed. After a lapse of a predetermined time, the light receiving element 30 makes a transition to a light receiving state by setting the voltage VL, which is to be applied to the anode of the light receiving element 30, to a proper negative voltage.

In this case, a final voltage Verror of Ve can be expressed as follows:

[Math. 2]

$$Verror \cong A|VL| \times \frac{1}{1+k} \qquad (2)$$

The voltage-division-ratio control circuit 112 outputs, for example, the value (signal) of k (information about a voltage division ratio) for determining the final voltage division ratio for an error determination circuit 108. The error determination circuit 108 properly holds and stores the value of k.

When a negative voltage is applied to VL, the error determination circuit 108 may determine an error according to expression (2) if a potential difference between V1 and V2 deviates from a predetermined range. For this determination, the error determination circuit 108 may use the value of k acquired from the voltage-division-ratio control circuit 112. The error determination circuit 108 outputs an error signal to a proper constituent element inside or outside the chip on the basis of the result. For example, if −20 V is applied to VL as a specified value, a final Verror is acquired by using a properly set voltage division ratio on the basis of expression (2), and then an error is determined on the basis of Verror.

For example, the error determination circuit 108 may determine an error on the basis of Verror within a predetermined voltage range. As another example, the error determination circuit 108 may calculate Vmonitor on the basis of the following expression and determine an error on the basis of Vmonitor.

[Math. 3]
$$Vmonitor = Verror \times (k + 1) \qquad (3)$$

Vmonitor in an ideal state is equal to the absolute value of VL if VL is a negative voltage. Thus, the value of Vmonitor may be compared with a predetermined voltage to determine an error depending upon whether Vmonitor falls within a predetermined voltage range. For example, in the case of Vth_min<Vmonitor<Vth_max, the error determination circuit 108 may determine that an error is absent, otherwise the error determination circuit 108 may determine that an error has occurred. Vth_min and Vth_max are voltages indicating the boundaries of the predetermined voltage range.

As a non-limiting example, if VDDA=3.6 [V], VSSA=0 [V], and VL=−20 [V] in a light receiving state are set, 1:k1=1:12 may be determined. In this case, Verror=1.67 [V] is desirably obtained. If a difference between V2 and V1 falls within the predetermined voltage range from 1.67 [V], the error determination circuit 108 determines that an error is absent. If the difference falls out of the range, the error determination circuit 108 determines that an error has occurred on a voltage to be applied to the light receiving element 30. If a voltage division ratio in external packaging slightly deviates from 1:12, an error determination can be properly implemented by properly controlling k1 as described above.

Note that FIGS. 4 and 5 are illustrated as examples and the implementation is not limited thereto. For example, in the state of FIG. 4, the voltage division ratio is likely to be considerably changed by turning on or off the switch.

Figure 6:
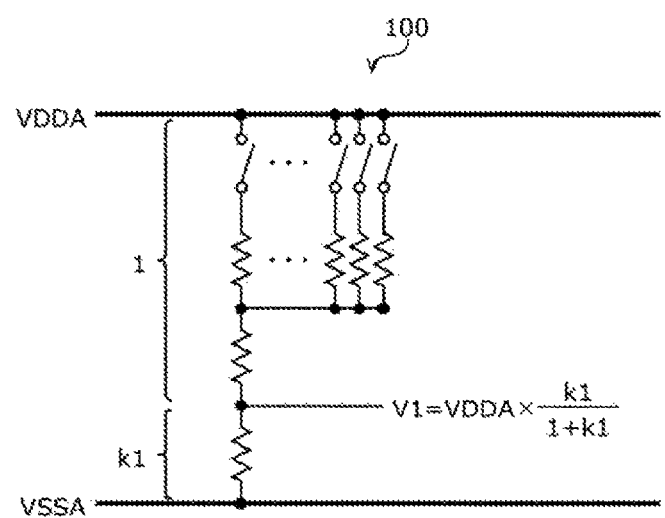
FIG. 6 is a circuit diagram illustrating an example of a first voltage-dividing circuit according to one embodiment.

FIG. 6 illustrates the first voltage-dividing circuit 100 for avoiding this state. As illustrated in FIG. 6, a resistor for fixing a voltage division ratio to some extent may be connected in series with resistors to be turned on or off by switches. In the initial state, a half of the switches may be set in an on-state with a voltage division ratio of 1:k1.

As described above, according to the present embodiment, a voltage division ratio preset in the chip and a voltage division ratio implemented outside the chip can be properly controlled to an equal voltage division ratio by controlling the voltage division ratio of the first voltage-dividing circuit 100 in the chip. A user of a light receiving device 1 externally mounts a voltage dividing circuit such that the voltage division ratio of VDDA and VL is 1:k1. The external voltage division ratio is not always equal to the voltage division ratio in the chip. The negative voltage monitoring circuit 10 according to the present embodiment can absorb a difference in voltage division ratio in the chip, thereby monitoring a negative voltage with a voltage division ratio properly reflected in external mounting.

Third Embodiment

In the second embodiment, the error detection circuit is provided in the voltage-division-ratio control circuit 112 and a voltage difference is calculated in the voltage-division-ratio control circuit 112. The implementation is not limited thereto. For example, an ADC for acquiring the errors of the outputs of the first amplifier circuit 102 and the second amplifier circuit 104 may be additionally provided.

Figure 7:
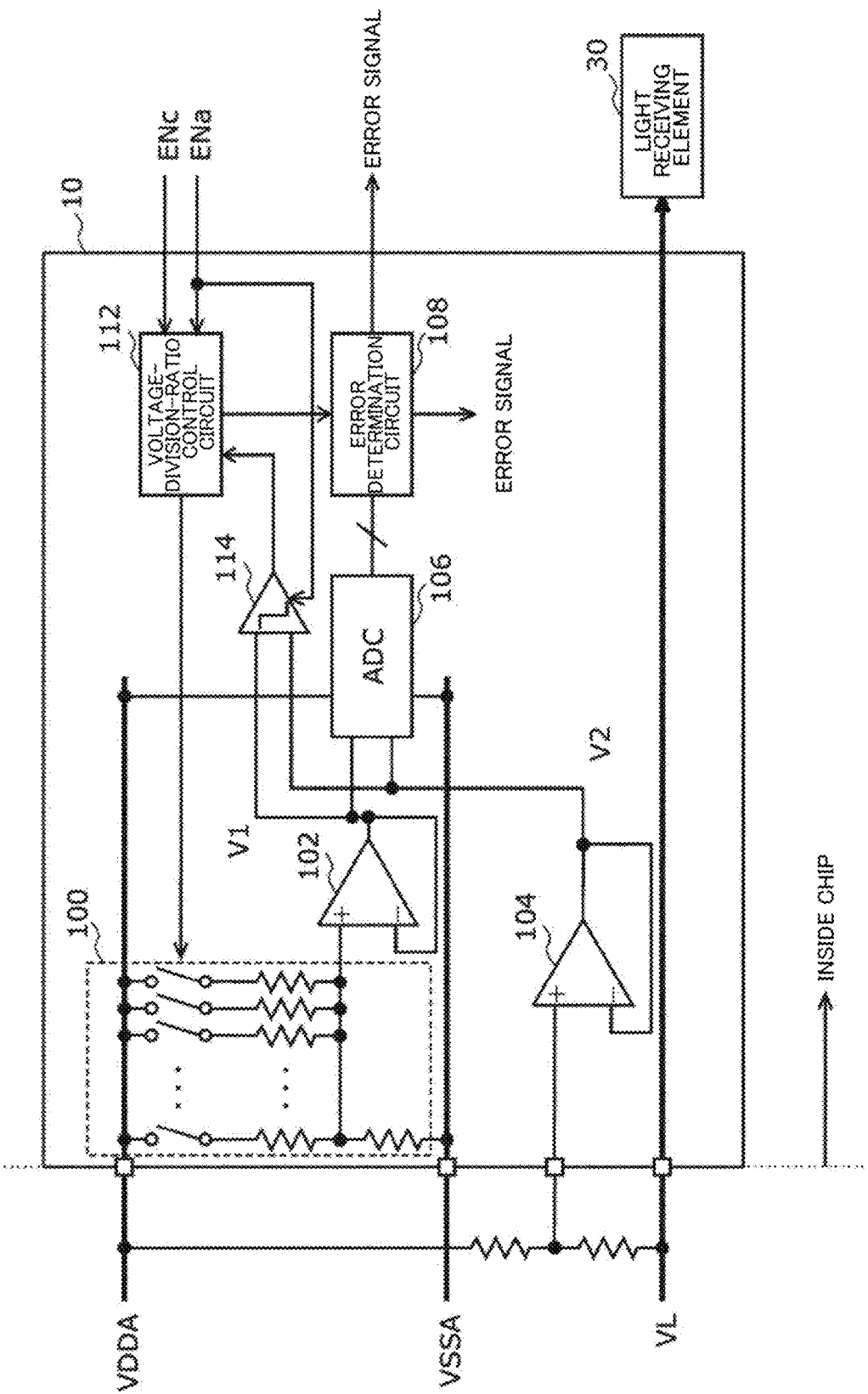
FIG. 7 is a schematic diagram of the configuration of a negative voltage monitoring circuit according to one embodiment.
Figure 8:
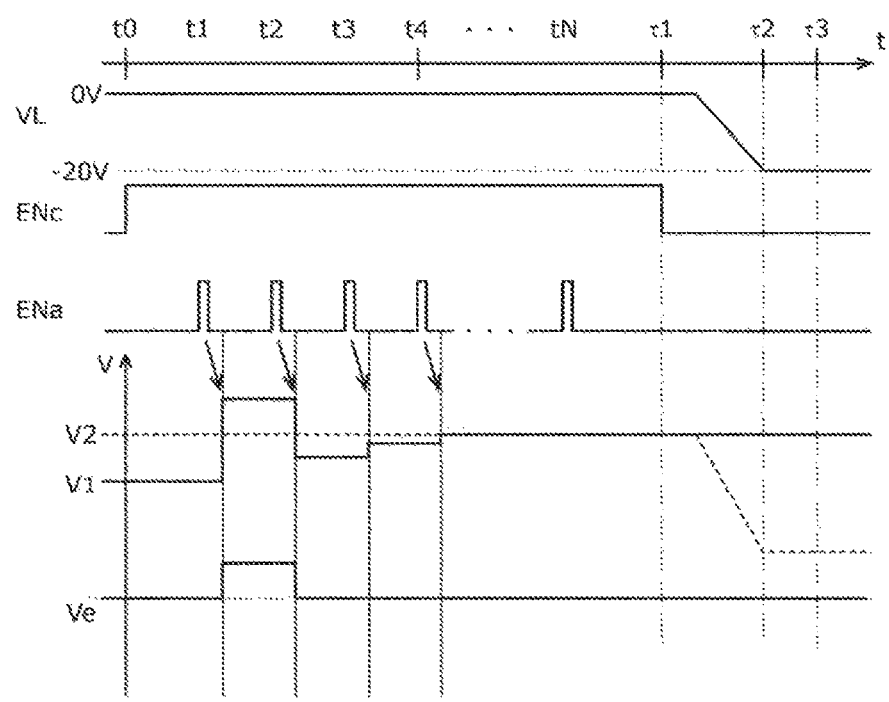
FIG. 8 is a timing chart for controlling the voltage division ratio of a first voltage-dividing circuit according to one embodiment.

FIG. 7 illustrates an example of a negative voltage monitoring circuit 10 according to the present embodiment. The negative voltage monitoring circuit 10 further includes a 1-bit ADC 114 in addition to the foregoing configuration. A first voltage-dividing circuit 100 may be configured like that of FIG. 6 as in the second embodiment. FIG. 8 is a timing chart corresponding to the circuit of FIG. 7.

The 1-bit ADC 114 is a circuit that detects a difference between an output V1 of a first amplifier circuit 102 and an output V2 of a second amplifier circuit 104 and corresponds to the foregoing error detection circuit. The 1-bit ADC 114 has the input end connected to the output of the first amplifier circuit 102 and the output of the second amplifier circuit 104 and the output end connected to a voltage-division-ratio control circuit 112. The 1-bit ADC 114 compares inputted voltages and outputs a signal according to the magnitude relationship. For example, the 1-bit ADC 114 produces an (binary) output of a Low signal for V1<=V2 and an (binary) output of a High signal for V1>V2.

On the basis of a binary signal outputted from the 1-bit ADC 114, the voltage-division-ratio control circuit 112 controls the resistance value of a first voltage-dividing circuit to control a voltage division ratio. In the present embodiment, when the 1-bit ADC 114 outputs the High signal, the voltage-division-ratio control circuit 112 outputs, to the first voltage-dividing circuit 100, a control signal for switching on/off of a switch with the timing of an enable signal. The first voltage-dividing circuit 100 corrects the voltage division ratio by switching, on the basis of the control signal, the states of a resistor to be connected. A calibration operation for the voltage division ratio of each constituent element is similar to that of the second embodiment and thus a detailed description is omitted.

At the start of application of a negative voltage to the anode of a light receiving element 30 after the completion of calibration, an error determination circuit 108 acquires a value by subtracting the outputs of the first amplifier circuit 102 and the second amplifier circuit 140 via an ADC 106 according to expressions (2) and (3), thereby implementing error determination. As shown in FIG. 8, in the present embodiment, Ve becomes a positive voltage when an error occurs in the positive direction (V1−V2>0), whereas Ve becomes, for example, a ground voltage when an error occurs in the negative direction.

As described above, also according to the present embodiment, a negative voltage applied from the outside of a chip to the anode of the light receiving element 30 can be properly converted into a voltage lower than a positive power supply voltage and can be properly monitored as in the second embodiment. In the monitoring, even if a voltage dividing circuit of a negative voltage is provided outside the chip, proper monitoring can be achieved as in the second embodiment by properly controlling a voltage division ratio in the chip. In the configuration of FIG. 4, digital signals may be compared with each other to output a binary signal and a voltage division ratio may be controlled by controlling the resistance value of the first voltage-dividing circuit 100 as described in the present embodiment.

Modification Example

The foregoing embodiments described the provision of the single negative voltage monitoring circuit. The embodiments of the present disclosure are not limited to this configuration. A plurality of negative voltage monitoring circuits may be provided in a chip forming the light receiving device. For example, two negative voltage monitoring circuits may be provided on the north and the south of the light receiving pixel array of the light receiving device 1.

Figure 9:
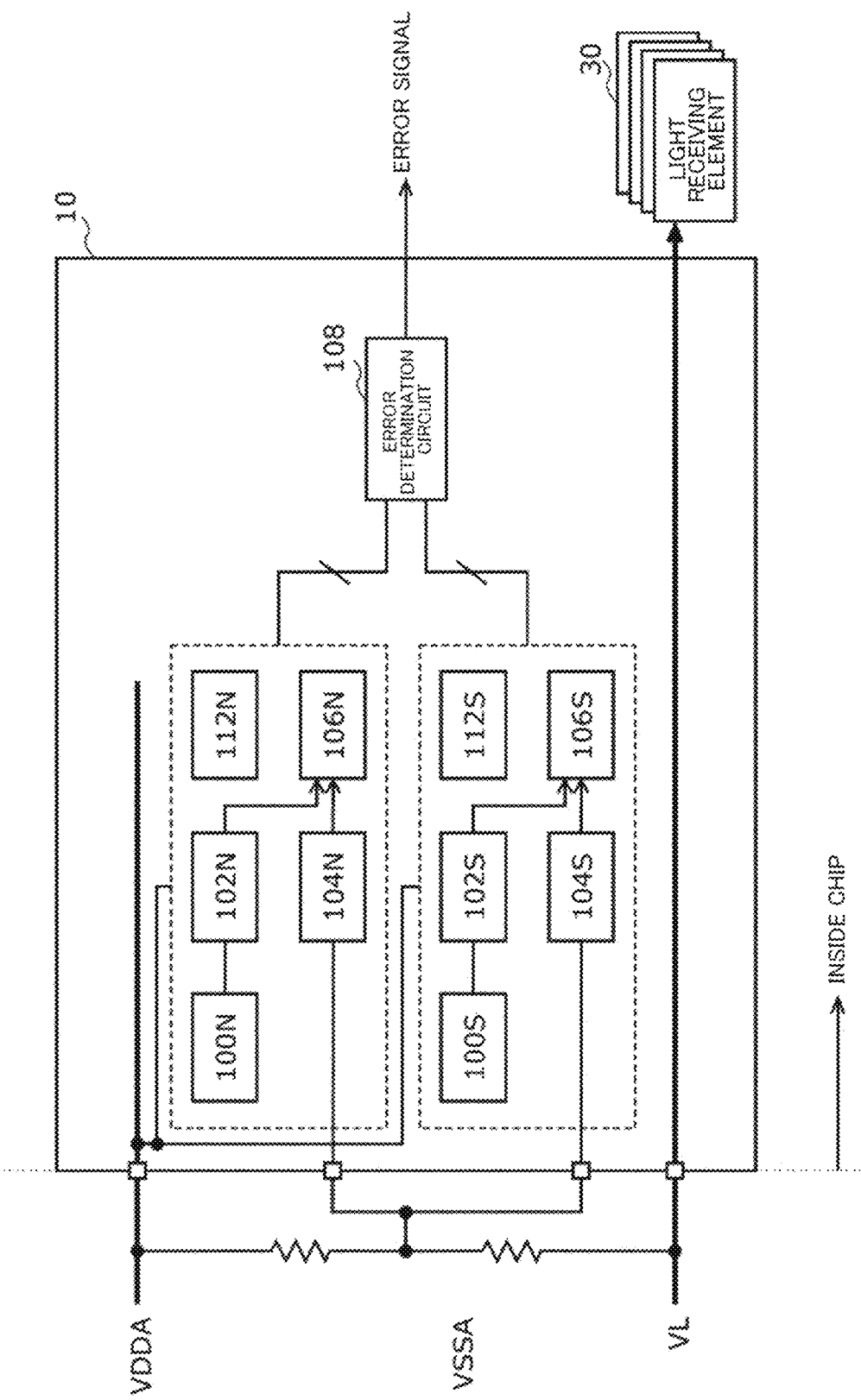
FIG. 9 is a schematic diagram of the configuration of a negative voltage monitoring circuit according to one embodiment.

FIG. 9 is a circuit diagram schematically illustrating an example of a negative voltage monitoring circuit 10 including two systems of voltage-dividing circuits. The negative voltage monitoring circuit 10 includes two systems: a system of a first voltage-dividing circuit 100N, a first amplifier circuit 102N, a second amplifier circuit 104N, an ADC 106N, and a voltage-division-ratio control circuit 112N and a system of a first voltage-dividing circuit 100S, a first amplifier circuit 102S, a second amplifier circuit 104S, an ADC 106S, and a voltage-division-ratio control circuit 112S.

A description of the circuits is similar to those of the foregoing embodiments and thus the detail thereof is omitted. FIG. 9 illustrates the negative voltage monitoring circuit 10 including the elements of the second embodiment. The elements of the first embodiment (for example, the voltage-division-ratio control circuits 112N/S) may be omitted or the elements of the third embodiment (for example, the 1-bit ADCs 114N/S) may be provided.

As described above, such configurations are provided, for example, around both ends of the light receiving pixel array, so that whether an applied negative voltage is biased or not can be determined from an area where the light receiving element 30 is present. Moreover, in the event of a failure in one of the systems, a negative voltage can be continuously monitored in the other system.

As described above, according to the present embodiment, redundancy can be achieved for elements that output a divided voltage of the negative voltage monitoring circuit. The redundancy can further improve safety if a negative voltage is biased in each area or a failure occurs in the voltage-dividing circuit.

(Layout Example)

Figure 10:
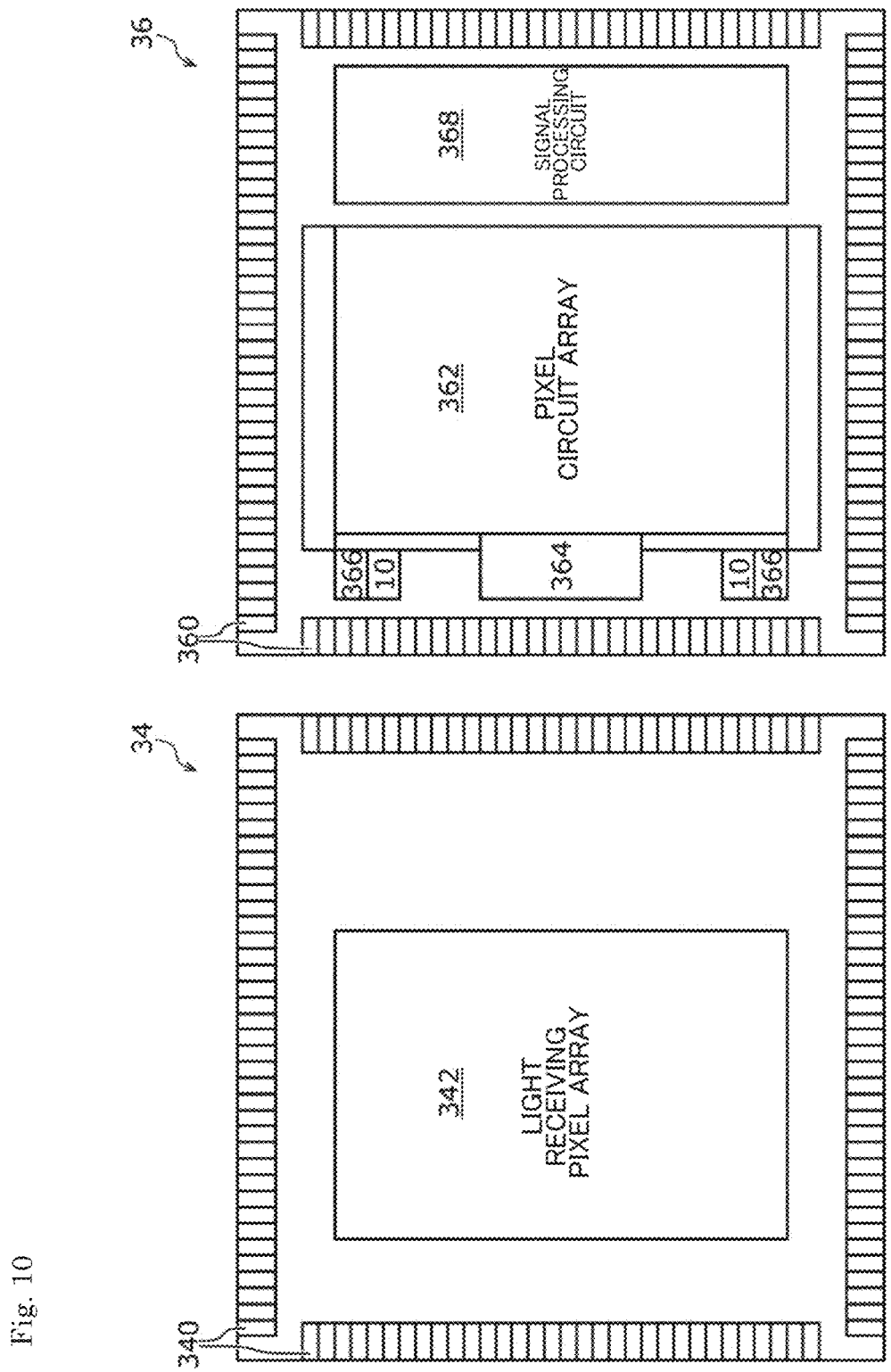
FIG. 10 is a schematic diagram illustrating the layout of a negative voltage monitoring circuit according to one embodiment.

FIG. 10 illustrates an example of the layout of light receiving pixels and the negative voltage monitoring circuit 10. The negative voltage monitoring circuit 10 described in the foregoing embodiments is disposed in the chip including the light-receiving element. The chip may be formed by stacking a plurality of semiconductor substrates. For example, the chip includes a first substrate 34 and a second substrate 36. The first substrate 34 and the second substrate 36 may be stacked as a semiconductor device encapsulated in the chip. For example, the light receiving element 30 in FIG. 1 may be disposed on the first substrate 34 and other configurations may be disposed on the second substrate 36.

For example, a semiconductor device illustrated in FIG. 10 may be used as a part of the configuration of a range sensor that includes the disclosed negative voltage monitoring circuit 10 and is used for a dToF (direct ToF). Some examples of the stacking will be described later.

The first substrate 34 may include pads 340 and a light receiving pixel array 342. Other necessary circuits or the like are mounted on the same semiconductor substrate or in the semiconductor substrate as appropriate. The illustration and description thereof are omitted.

The pads 340 connect the stacked semiconductor substrates (first substrate 34 and second substrate 36) or connect the outside and the inside of the chip. For example, various signals and voltages may be transmitted and received to and from the semiconductor layers through the pads 340.

The light receiving pixel array 342 is an area in which the light receiving elements 30 are provided in an array. A negative voltage is applied to the anode of the light receiving element 30.

The second substrate 36 may include pads 360, a pixel circuit array 362, a failure detection circuit 364, temperatures 366, a signal processing circuit 368, and the negative voltage monitoring circuits 10 described in the foregoing embodiments.

The pads 360 are electrically connected to the pads 340 and transmit and receive signals between the first substrate 34 and the second substrate 36. The pads 360 may transmit and receive signals to and from the outside of the chip like the pads 340 when necessary.

The pixel circuit array 362 is formed with an array of the pixel circuits 32 that properly process signals outputted from the light receiving elements 30 disposed in the light receiving pixel array 342 and output the signals. The pixel circuit 32 may be provided for each of the light receiving elements 30. As another example, the pixel circuit 32 configured to share, for example, floating diffusion may be provided for each of a predetermined number of light receiving elements 30. The pixel circuit is electrically connected to one or more light receiving elements 30 in a proper manner.

The negative voltage monitoring circuit 10 monitors whether a proper negative voltage is applied to the light receiving element 30, by monitoring divided voltages of a negative voltage and a power supply voltage. Thus, the negative voltage monitoring circuit 10 is mounted around the pixel circuit array 362.

The failure detection circuit 364 detects a failure of the light receiving element 30 or various circuits mounted on the same semiconductor layer. When necessary, the location of a failure is detected and a failure signal is outputted to external or internal constituent elements.

The temperature 366 is a circuit that detects the temperature of a semiconductor layer including the light receiving pixel array 362. The negative voltage monitoring circuit 10 can share, for example, an ADC with the temperature 366. As described above, the ADC 106 illustrated in, for example, FIG. 2 may be shared with the temperature 366. Furthermore, the ADC 106 may operate as a BGR that converts a power supply voltage inputted from the outside or the voltage of a signal generated in the negative voltage monitoring circuit 10 or the like into a proper voltage in various circuits.

The signal processing circuit 368 properly processes a signal outputted from the pixel circuit 32 of the pixel circuit array 364 and generates a signal used for, for example, control in the chip or a signal to be outputted to the outside of the chip.

As illustrated in FIG. 10, the configuration can be provided with the negative voltage monitoring circuit 10 with two systems described in the modification example.

As some non-limiting specific examples, the semiconductor layer may be implemented as a semiconductor layer described below. The semiconductor layer is not limited to this implementation, and the implementation may be provided in various ways. Moreover, only representative circuit information is described and other necessary circuits are disposed at proper positions as appropriate.

Figure 11:
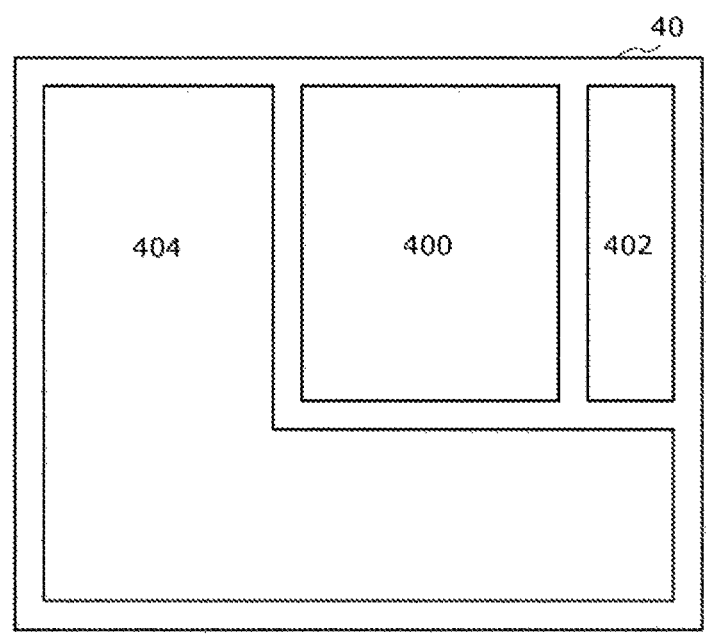
FIG. 11 is a schematic diagram illustrating the configuration of a light receiving device according to one embodiment.

FIG. 11 is a formation example of a light receiving device provided with the negative voltage monitoring circuit 10. A substrate 40 includes a pixel region 400, a control circuit 402, and a logic circuit 404. As illustrated in FIG. 11, the pixel region 400, the control circuit 402, and the logic circuit 404 may be provided on the same substrate 40.

The pixel region 400 is, for example, a region in which the light receiving pixel array 302 or the like is provided. The pixel circuit or the like may be provided in the pixel region 400 as appropriate or may be provided in another region, which is not illustrated, on the substrate 40.

The control circuit 402 generates, for example, a necessary signal for controlling the light receiving pixel or the like on the chip, outputs the generated signal to the light receiving pixel or the like, and controls each constituent element. The logic circuit 404 includes, for example, a signal processing circuit that properly performs signal processing on a signal outputted from the light receiving element 30 provided in the pixel region 400. The logic circuit 404 may perform signal processing or the like after an analog signal outputted from the light receiving element 30 is converted into a digital signal by a provided A/D converter circuit. In this case, in the input unit of the logic circuit 404, a part of the A/D converter circuit or the like may be formed by a circuit for handling an analog signal. As another example, a digital signal may be properly subject to signal processing in the logic circuit 404 after A/D conversion in the pixel circuit.

The logic circuit 404 may include, for example, an image processing circuit as a part of a signal processing circuit. The signal processing circuit and at least a part of the image processing circuit may be mounted on another signal processing chip provided at a different location from the substrate 40 or may be mounted in another processor. For example, the signal processing circuit 368 of FIG. 10 may be disposed as a part of the logic circuit 404.

The negative voltage monitoring circuit 10 described in the foregoing embodiments may be adjacent to the pixel region 400 or mounted in a region close to the pixel region 400 in, for example, the control circuit 402 or the logic circuit 404.

Figure 12:
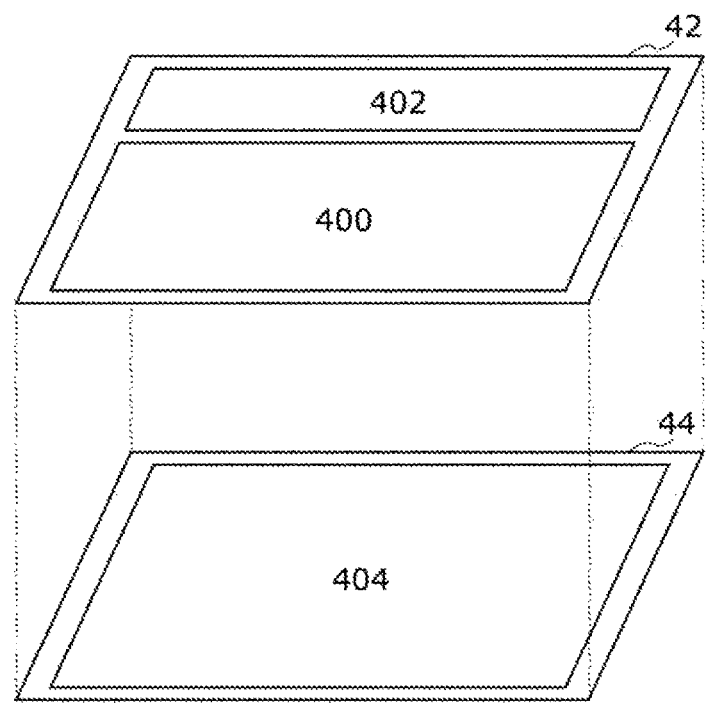
FIG. 12 is a schematic diagram illustrating the configuration of a light receiving device according to one embodiment.

FIG. 12 illustrates another implementation example of the light receiving device. The first substrate 42 and the second substrate 44 are provided as substrates. The first substrate 42 and the second substrate 44 have a laminated structure in which signals can be properly transmitted and received via Cu—Cu connection or a connecting portion, e.g., a via hole. For example, the first substrate 42 may include the pixel region 400 and the control circuit 402 while the second substrate 44 may include the logic circuit 404.

Figure 13:
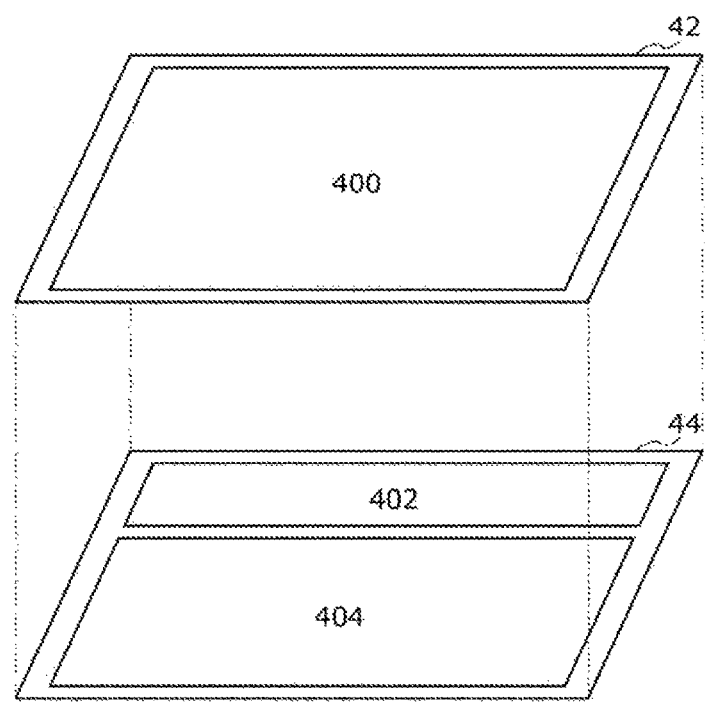
FIG. 13 is a schematic diagram illustrating the configuration of a light receiving device according to one embodiment.

FIG. 13 illustrates still another implementation example of the light receiving device. The first substrate 42 and the second substrate 44 are provided as substrates. The first substrate 42 and the second substrate 44 have a laminated structure in which signals can be properly transmitted and received via a connecting portion, e.g., a via hole. For example, the first substrate 42 may include the pixel region 400 while the second substrate 44 may include the control circuit 402 the logic circuit 404.

In FIGS. 11 to 13, a storage region for storing data in a temporary or nontemporary manner may be optionally provided. In addition to these substrates, a substrate for a storage region may be provided between the first substrate 42 and the second substrate 44 or under the second substrate 44.

The stacked substrates may be connected via a via hole as described above or may be connected by methods such as micro dump. The substrates can be stacked by any method of, for example, CoC (Chip on Chip), CoW (Chip on Wafer), or WoW (Wafer on Wafer).

The technique according to the present disclosure can be applied to various products. For example, the technique according to the present disclosure may be implemented as an apparatus mounted on any kind of mobile body such as an automobile, an electric vehicle, a hybrid electric vehicle, a motorcycle, a bicycle, a personal mobility, an airplane, a drone, a ship, a robot, a construction machine, or an agricultural machine (tractor).

Figure 14:
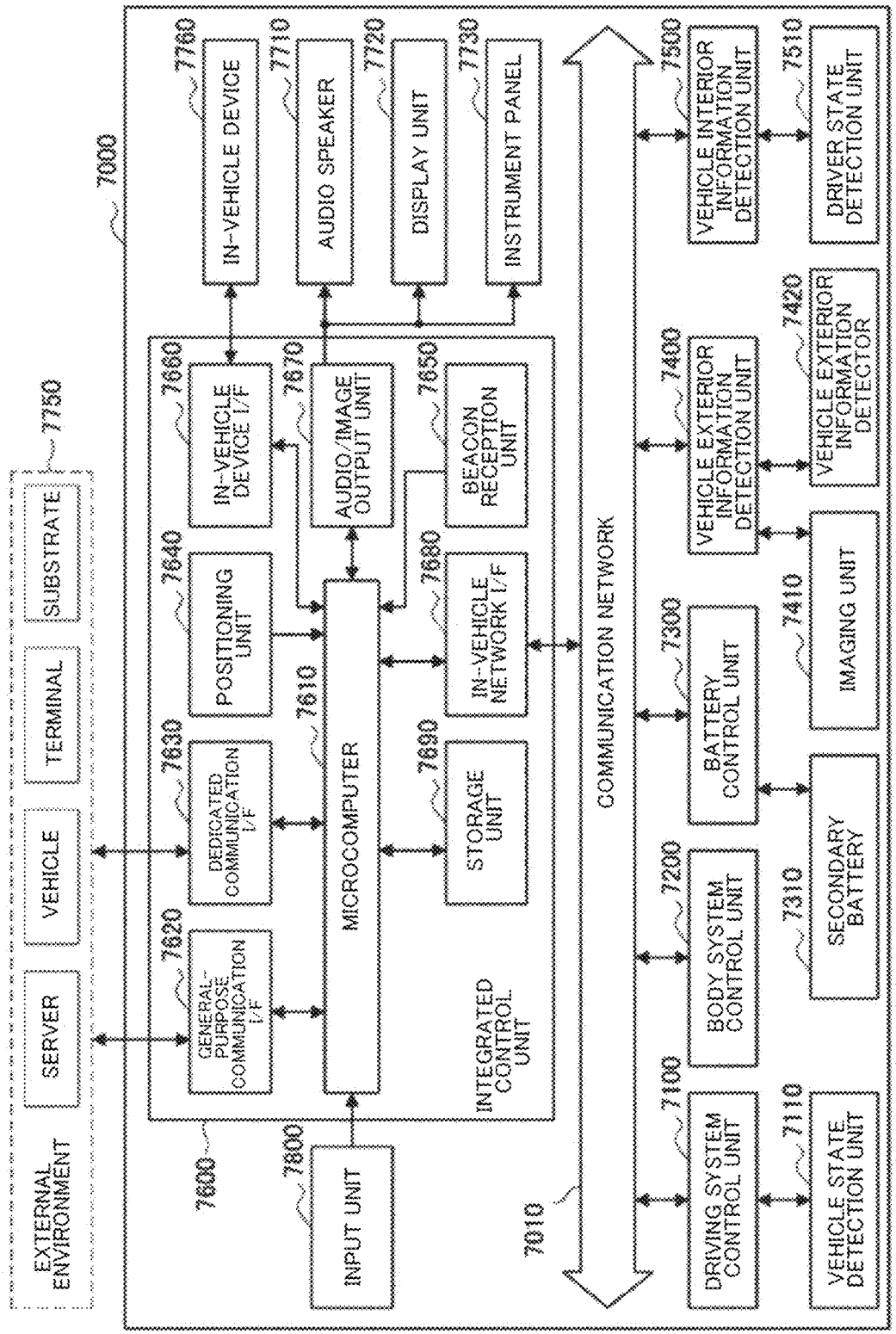
FIG. 14 is a block diagram illustrating an example of a schematic configuration of a vehicle control system.

FIG. 14 is a block diagram illustrating a schematic configuration example of a vehicle control system 7000 that is an example of a mobile body control system to which the technique according to the present disclosure is applicable. The vehicle control system 7000 includes a plurality of electronic control units connected via a communication network 7010. In the example illustrated in FIG. 14, the vehicle control system 7000 includes a driving system control unit 7100, a body system control unit 7200, a battery control unit 7300, a vehicle exterior information detection unit 7400, a vehicle interior information detection unit 7500, and an integrated control unit 7600. The communication network 7010 connecting the plurality of control units may be, for example, an in-vehicle communication network compliant with any standards such as CAN (Controller Area Network), LIN (Local Interconnect Network), LAN (Local Area Network), and FlexRay (registered trademark).

Each of the control units includes a microcomputer that performs arithmetic processing according to various programs, a storage unit that stores programs executed by the microcomputer, parameters or the like used for various calculations, and a drive circuit that drives various devices to be controlled. Each of the control units includes a network I/F for performing communications with other control units via the communication network 7010, and includes a communication I/F for performing communications through wire communications or radio communications with devices or sensors or the like inside or outside the vehicle. In FIG. 14, a microcomputer 7610, a general-purpose communication I/F 7620, a dedicated communication I/F 7630, a positioning unit 7640, a beacon reception unit 7650, an in-vehicle device I/F 7660, an audio/image output unit 7670, an in-vehicle network I/F 7680, and a storage unit 7690 are illustrated as functional configurations of the integrated control unit 7600. Other control units also include a microcomputer, a communication I/F, and a storage unit.

The driving system control unit 7100 controls the operations of devices related to the drive system of the vehicle according to various programs. For example, the driving system control unit 7100 functions as a control device for a driving force generation device for generating a vehicle driving force of an internal combustion engine or a drive motor, a driving force transmission mechanism for transmitting the driving force to wheels, a steering mechanism for adjusting a steering angle of the vehicle, a braking device that generates a braking force of the vehicle. The driving system control unit 7100 may have a function as a control device, for example, an ABS (Antilock Brake System) or ESC (Electronic Stability Control).

A vehicle state detection unit 7110 is connected to the driving system control unit 7100. The vehicle state detection unit 7110 includes, for example, at least one of a gyro sensor that detects an angular velocity of an axial rotation motion of a vehicle body, an acceleration sensor that detects an acceleration of a vehicle, and sensors for detecting an operation amount of an accelerator pedal, an operation amount of a brake pedal, a steering angle of a steering wheel, an engine speed, a rotation speed of wheels, and the like. The driving system control unit 7100 performs arithmetic processing using a signal inputted from the vehicle state detection unit 7110 and controls an internal combustion engine, a drive motor, an electric power steering device, or a braking device or the like.

The body system control unit 7200 controls the operations of various devices in the vehicle body according to various programs. For example, the body system control unit 7200 functions as a control device of a keyless entry system, a smart key system, a power window device, or various lamps such as a head lamp, a back lamp, a brake lamp, a turn indicator, and a fog lamp. In this case, radio waves emitted from a portable device in place of a key or signals of various switches can be inputted to the body system control unit 7200. The body system control unit 7200 receives the inputs of radio waves or signals and controls a door lock device, a power window device, and a lamp of the vehicle.

The battery control unit 7300 controls a secondary battery 7310, which is a power supply source of a driving motor, according to various programs. For example, information such as a battery temperature, a battery output voltage, or a remaining capacity of a battery is inputted to the battery control unit 7300 from a battery device including the secondary battery 7310. The battery control unit 7300 performs arithmetic processing using these signals and performs temperature adjustment control of the secondary battery 7310 or control of a cooling device provided in the battery device.

The vehicle exterior information detection unit 7400 detects information outside the vehicle in which the vehicle control system 7000 is mounted. For example, at least one of an imaging unit 7410 and a vehicle exterior information detector 7420 is connected to the vehicle exterior information detection unit 7400. The imaging unit 7410 includes at least one of a ToF (Time Of Flight) camera, a stereo camera, a monocular camera, an infrared camera, and other cameras. The vehicle exterior information detector 7420 includes at least one of, for example, an environmental sensor for detecting a current weather or atmospheric phenomenon and a surrounding information detection sensor for detecting other vehicles, obstacles, or pedestrians or the like around the vehicle in which the vehicle control system 7000 is mounted.

The environmental sensor may be, for example, at least one of a raindrop sensor that detects rainy weather, a fog sensor that detects fog, a sunshine sensor that detects the degree of sunshine, and a snow sensor that detects snowfall. The surrounding information detection sensor may be at least one of an ultrasonic sensor, a radar device, and a LIDAR (Light Detection and Ranging, Laser Imaging Detection and Ranging) device. The imaging unit 7410 and the vehicle exterior information detector 7420 may be provided as independent sensors or devices or may be provided as a device in which a plurality of sensors or devices are integrated.

Figure 15:
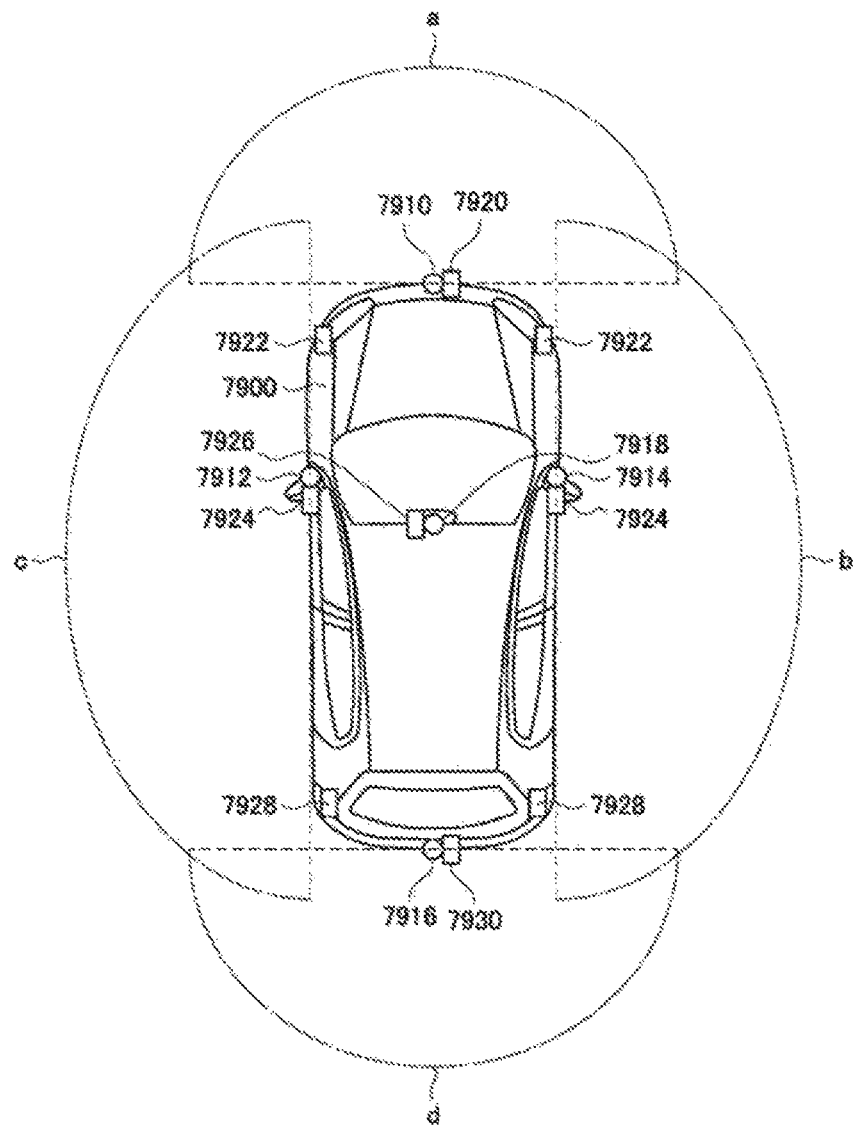
FIG. 15 is an explanatory drawing illustrating an example of the installation positions of a vehicle exterior information detection unit and imaging units.

FIG. 15 illustrates an example of the installation positions of the imaging unit 7410 and the vehicle exterior information detector 7420. Imaging units 7910, 7912, 7914, 7916, and 7918 are provided, for example, at the position of at least one of a front nose, side mirrors, a rear bumper, a back door, and an upper part of a windshield inside the vehicle of a vehicle 7900. The imaging unit 7910 provided at the front nose and the imaging unit 7918 provided in the upper part of the windshield inside the vehicle mainly acquire images ahead of the vehicle 7900. The imaging units 7912 and 7914 provided at the side mirrors mainly acquire images on the sides of the vehicle 7900. The imaging unit 7916 provided at the rear bumper or the back door mainly acquires an image behind the vehicle 7900. The imaging unit 7918 provided in the upper part of the windshield inside the vehicle is mainly used for detecting, for example, a vehicle ahead, a pedestrian, an obstacle, a traffic light, a traffic sign, or a lane.

In FIG. 15, an example of the imaging ranges of the imaging units 7910, 7912, 7914, and 7916 is illustrated. An imaging range a indicates the imaging range of the imaging unit 7910 provided at the front nose, imaging ranges b and c indicate the imaging ranges of the imaging units 7912 and 7914 provided at the side mirrors, and an imaging range d indicates the imaging range of the imaging unit 7916 provided at the rear bumper or the back door. For example, a bird's-eye view image of the vehicle 7900 can be obtained by superimposing image data captured by the imaging units 7910, 7912, 7914, and 7916.

Vehicle exterior information detectors 7920, 7922, 7924, 7926, 7928, and 7930 provided at the front, the rear, the sides, and the corners of the vehicle 7900 and an upper part of the windshield inside the vehicle may be, for example, ultrasonic sensors or radar devices. The vehicle exterior information detectors 7920, 7926, and 7930 provided at the front nose, the rear bumper, and the back door of the vehicle 7900 and the upper part of the windshield inside the vehicle cabin may be, for example, LIDAR devices. These vehicle exterior information detectors 7920 to 7930 are mainly used for detecting a vehicle ahead, a pedestrian, or an obstacle or the like.

The description will be continued with reference to FIG. 14 again. The vehicle exterior information detection unit 7400 causes the imaging unit 7410 to capture an image of the outside of the vehicle and receives captured image data. Furthermore, the vehicle exterior information detection unit 7400 receives detection information from the connected vehicle exterior information detector 7420. If the vehicle exterior information detector 7420 is an ultrasonic sensor, a radar device, or a LIDAR device, the vehicle exterior information detection unit 7400 transmits, for example, ultrasonic waves or electromagnetic waves and receives information on received reflected waves. The vehicle exterior information detection unit 7400 may perform object detection or distance detection of a person, a vehicle, an obstacle, a sign, or a character on a road surface or the like on the basis of the received information. The vehicle exterior information detection unit 7400 may perform environment recognition for recognizing rainfall, fog, or a road surface situation or the like on the basis of the received information. The vehicle exterior information detection unit 7400 may calculate a distance to an object outside the vehicle on the basis of the received information.

Furthermore, the vehicle exterior information detection unit 7400 may perform image recognition or distance detection for recognizing, for example, a person, a vehicle, an obstacle, a sign, or a character on a road surface on the basis of the received image data. The vehicle exterior information detection unit 7400 may perform processing such as distortion correction or alignment on the received image data, and combine image data captured by the different imaging unit 7410 to generate a bird's-eye view image or a panoramic image. The vehicle exterior information detection unit 7400 may perform viewpoint conversion using the image data captured by the different imaging unit 7410.

The vehicle interior information detection unit 7500 detects information inside the vehicle. For example, a driver state detection unit 7510 that detects a driver's state is connected to the vehicle interior information detection unit 7500. The driver state detection unit 7510 may include a camera that images a driver, a biological sensor that detects biological information of the driver, or a microphone that collects a sound in the vehicle. The biosensor is provided on, for example, a seat surface or the steering wheel and detects biometric information of a passenger sitting on a seat or a driver holding the steering wheel. The vehicle interior information detection unit 7500 may calculate the degree of fatigue or the degree of concentration of the driver or determine whether the driver is drowsing based on detected information inputted from the driver state detection unit 7510. The vehicle interior information detection unit 7500 may perform processing such as noise cancellation on a collected sound signal.

The integrated control unit 7600 controls overall operations in the vehicle control system 7000 according to various programs. An input unit 7800 is connected to the integrated control unit 7600. The input unit 7800 is implemented by a device that can be operated for input by a passenger, for example, a touch panel, a button, a microphone, a switch, or a lever. Data obtained by recognizing voice inputted through a microphone may be inputted to the integrated control unit 7600. The input unit 7800 may be, for example, a remote control device using infrared rays or other radio waves, or may be an externally connected device such as a mobile phone or a PDA (Personal Digital Assistant) corresponding to an operation on the vehicle control system 7000. The input unit 7800 may be, for example, a camera. In this case, the passenger can input information by gesture. Alternatively, data obtained by detecting a movement of a wearable device worn by the passenger may be inputted. Furthermore, the input unit 7800 may include, for example, an input control circuit that generates an input signal on the basis of information inputted by a passenger or the like using the input unit 7800 and outputs the input signal to the integrated control unit 7600. The passenger or the like inputs various kinds of data to the vehicle control system 7000 or provides an instruction for a processing operation by operating the input unit 7800.

The storage unit 7690 may include a ROM (Read Only Memory) that stores various programs to be executed by a microcomputer, and a RAM (Random Access Memory) that stores various parameters, calculation results, or sensor values or the like. The storage unit 7690 may be implemented by, for example, a magnetic storage device such as an HDD (Hard Disc Drive), a semiconductor storage device, an optical storage device, or a magneto-optical storage device.

The general-purpose communication I/F 7620 is a general-purpose communication I/F that mediates communication with various devices present in an external environment 7750. The general-purpose communication I/F 7620 may have, implemented therein, a cellular communication protocol such as GSM (Global System of Mobile communications) (registered trademark), WiMAX (registered trademark), LTE (Long Term Evolution) (registered trademark), or LTE-A (LTE-Advanced), or other wireless communication protocols such as wireless LAN (also referred to as Wi-Fi (registered trademark)) or Bluetooth (registered trademark). The general-purpose communication I/F 7620 may be connected to, for example, a device (for example, an application server or a control server) present on an external network (for example, the Internet, a cloud network, or a business-specific network) via a base station or an access point. The general-purpose communication I/F 7620 may be connected to terminals (for example, the terminals of the driver, pedestrians, or shops, or MTC (Machine Type Communication) terminals) near the vehicle by using, for example, P2P (Peer To Peer) technology.

The dedicated communication I/F 7630 is a communication I/F supporting a communication protocol formulated for the purpose of use in a vehicle. The dedicated communication I/F 7630 may implement, for example, a standard protocol such as a WAVE (Wireless Access in Vehicle Environment) that is a combination of IEEE802.11p of a lower layer and IEEE1609 of an upper layer, a DSRC (Dedicated Short Range Communications), or a cellular communication protocol. The dedicated communication I/F 7630 typically performs V2X communications as a concept including one or more of vehicle to vehicle communications, vehicle to infrastructure communications, vehicle to home communications, and vehicle to pedestrian communications.

The positioning unit 7640 receives, for example, a GNSS signal from a GNSS (Global Navigation Satellite System) satellite (for example, a GPS signal from a GPS (Global Positioning System) satellite), executes positioning, and generates position information including a latitude, longitude, and altitude of the vehicle. The positioning unit 7640 may specify a current position by exchanging signals with a wireless access point, or may acquire position information from a terminal, e.g., a mobile phone, a PHS phone, or a smartphone with a positioning function.

The beacon reception unit 7650 receives radio waves or electromagnetic waves transmitted from a radio station or the like installed on a road and acquires information about a current position, traffic jam, a closed road, or a required time. The function of the beacon reception unit 7650 may be included in the dedicated communication I/F 7630.

The in-vehicle device I/F 7660 is a communication interface that mediates connections between the microcomputer 7610 and various in-vehicle devices 7760 present in the vehicle. The in-vehicle device I/F 7660 may establish a wireless connection using wireless communication protocols such as a wireless LAN, Bluetooth (registered trademark), NFC (Near Field Communication), and WUSB (Wireless USB). Furthermore, the in-vehicle device I/F 7660 may establish a wired connection of, for example, a USB (Universal Serial Bus), HDMI (registered trademark) (High-Definition Multimedia Interface), or MHL (Mobile High-definition Link) via a connection terminal (not illustrated) (and a cable if necessary). The in-vehicle device 7760 may include, for example, at least one of a mobile device or wearable device of a passenger and an information device carried in or attached to the vehicle. Furthermore, the in-vehicle device 7760 may include a navigation device that searches for a route to any destination. The in-vehicle device I/F 7660 exchanges control signals or data signals with the in-vehicle devices 7760.

The in-vehicle network I/F 7680 is an interface that mediates communications between the microcomputer 7610 and the communication network 7010. The in-vehicle network I/F 7680 transmits and receives signals or the like in conformity with a predetermined protocol supported by the communication network 7010.

The microcomputer 7610 of the integrated control unit 7600 controls the vehicle control system 7000 in accordance with various programs based on information acquired through at least one of the general-purpose communication I/F 7620, the dedicated communication I/F 7630, the positioning unit 7640, the beacon reception unit 7650, the in-vehicle device I/F 7660, and the in-vehicle network I/F 7680. For example, the microcomputer 7610 may calculate control target values for a driving force generation device, a steering mechanism, or a braking device on the basis of acquired information on the inside and outside of the vehicle, and output control commands to the driving system control unit 7100. For example, the microcomputer 7610 may perform cooperative control for the purpose of implementing the functions of ADAS (Advanced Driver Assistance System), the functions including vehicle collision avoidance or impact mitigation, follow-up traveling based on an inter-vehicle distance, vehicle speed maintenance driving, a vehicle collision warning, and a vehicle lane departure warning. The microcomputer 7610 may perform coordinated control for automated driving in which a vehicle travels autonomously regardless of an operation of a driver, by controlling, for example, a driving force generation device, a steering mechanism, or a braking device on the basis of acquired surrounding information on the vehicle.

The microcomputer 7610 may generate three-dimensional distance information between the vehicle and objects such as surrounding structures or persons on the basis of information acquired via at least one of the general-purpose communication I/F 7620, the dedicated communication I/F 7630, the positioning unit 7640, the beacon reception unit 7650, the in-vehicle device I/F 7660, and the in-vehicle network I/F 7680 and may generate local map information including surrounding information of a current position of the vehicle. The microcomputer 7610 may predict a danger such as a collision of the vehicle, approach of a pedestrian, or entry into a closed road on the basis of the acquired information and may generate a warning signal. The warning signal may be, for example, a signal for generating an alarm sound or turning on a warning lamp.

The audio/image output unit 7670 transmits at least one of audio and image output signals to an output device capable of visually or audibly notifying a passenger of the vehicle or the outside of the vehicle of information. In the example of FIG. 14, an audio speaker 7710, a display unit 7720, and an instrument panel 7730 are illustrated as output devices. The display unit 7720 may include, for example, at least one of an on-board display and a head-up display. The display unit 7720 may have an AR (Augmented Reality) display function. The output device may be other devices such as a headphone, a wearable device such as a glasses-type display worn by a passenger, a projector, and a lamp. If the output device is a display device, the display device visually displays results obtained through various kinds of processing performed by the microcomputer 7610 or information received from another control unit, in various formats such as text, images, tables, and graphs. If the output device is a sound output device, the sound output device converts an audio signal including reproduced sound data or acoustic data into an analog signal and aurally outputs the analog signal.

In the example illustrated in FIG. 14, at least two control units connected via the communication network 7010 may be integrated into a single control unit. Alternatively, each control unit may be configured with a plurality of control units. Furthermore, the vehicle control system 7000 may include another control unit, which is not illustrated. Moreover, in the above description, some or all of the functions of any one of the control units may be provided for another control unit. In other words, predetermined arithmetic processing may be performed by any one of the control units if information is transmitted and received via the communication network 7010. Similarly, a sensor or device connected to any one of the control units may be connected to another control unit, and a plurality of control units may transmit and receive detection information to and from one another via the communication network 7010.

A computer program for implementing functions of information processing in a circuit can be installed in any of the control units or the like. Furthermore, a computer-readable recording medium in which the computer program is stored can be provided. The recording medium is, for example, a magnetic disk, an optical disc, a magneto optical disc, or a flash memory. Moreover, the computer program may be distributed via, for example, a network without using the recording medium.

In the vehicle control system 7000, the negative voltage monitoring circuit 10 according to the present embodiment can be mounted in the vehicle exterior information detector 7420 of the application example illustrated in FIG. 14.

Furthermore, at least some of the constituent elements of the negative voltage monitoring circuit 10 may be implemented in a module for the vehicle exterior information detector 7420 illustrated in FIG. 14 (for example, an integrated circuit module configured with a single die). Alternatively, the negative voltage monitoring circuit 10 may be implemented by the plurality of control units of the vehicle control system 7000 illustrated in FIG. 14.

The foregoing embodiments may be configured as follows:

(1) A negative voltage monitoring circuit including:
  a first voltage-dividing circuit that divides a power supply voltage and outputs a first voltage;
  a first amplifier circuit configured such that the first voltage is inputted to a noninverting input terminal and an output voltage is subjected to negative feedback;
  a second amplifier circuit configured such that a second voltage is inputted to the noninverting input terminal, the second voltage being obtained by dividing a potential difference between the power supply voltage and a voltage to be monitored, the voltage being applied to an anode of a light receiving element, and an output voltage is subjected to negative feedback; and
  an error determination circuit that outputs an error signal on the basis of a difference between the output of the first amplifier circuit and the output of the second amplifier circuit.

(2)
  The negative voltage monitoring circuit according to (1), wherein the light receiving element is a SPAD (Single Photon Avalanche Diode).

(3)
  The negative voltage monitoring circuit according to (1) or (2), wherein a negative voltage is applied to the anode of the light receiving element in a light receiving state.

(4)
  The negative voltage monitoring circuit according to (3), further including an error detection circuit that acquires a potential difference between the first amplifier circuit and the second amplifier circuit in a state in which a negative voltage is not applied to the anode of the light receiving element.

(5)
  The negative voltage monitoring circuit according to (4), further including a voltage-division-ratio control circuit that controls the voltage division ratio of the first voltage-dividing circuit on the basis of the output of the error detection circuit.

(6)
  The negative voltage monitoring circuit according to (5), wherein the voltage-division-ratio control circuit outputs a signal including information about the controlled voltage division ratio to the error determination circuit.

(7)
  The negative voltage monitoring circuit according to (6), wherein the error determination circuit compares a voltage obtained by amplifying, by the amplification factor of the first amplifier circuit, a voltage determined by dividing the power supply voltage according to the voltage division ratio controlled by the voltage-division-ratio control circuit and a voltage obtained by amplifying, by the amplification factor of the second amplifier circuit, a voltage determined by dividing the power supply voltage and a predetermined negative voltage, and makes an error determination.

(8)

The negative voltage monitoring circuit according to any one of (5) to (7), wherein
the error detection circuit outputs binary information obtained by comparing the output of the first amplifier circuit and the output of the second amplifier circuit, and
the voltage-division-ratio control circuit controls the voltage division ratio on the basis of the binary information.

(9)

The negative voltage monitoring circuit according to (8), wherein the voltage-division-ratio control circuit controls the resistance value of the first voltage-dividing circuit to control the voltage division ratio.

(10)

The negative voltage monitoring circuit according to any one of (5) to (7), wherein
the error detection circuit outputs binary information obtained by comparing the result of converting the output of the first amplifier circuit into a digital signal and the result of converting the output of the second amplifier circuit into a digital signal, and
the voltage-division-ratio control circuit controls the voltage division ratio on the basis of the binary information.

(11)

The negative voltage monitoring circuit according to (10), wherein the voltage-division-ratio control circuit controls the resistance value of the first voltage-dividing circuit to control the voltage division ratio.

(12)

The negative voltage monitoring circuit according to any one of (1) to (11), further including a second voltage-dividing circuit that divides a potential difference between the power supply voltage and the voltage to be monitored and outputs the second voltage.

(13)

The negative voltage monitoring circuit according to any one of (1) to (12), wherein two systems of the first voltage-dividing circuit, the first amplifier circuit, and the second amplifier circuit are provided.

(14)

A light receiving device including:
the negative voltage monitoring circuit according to (8); and
a second voltage-dividing circuit that divides a potential difference between the power supply voltage and a terminal to which a negative voltage is to be applied and outputs a second voltage, wherein
the negative voltage monitoring circuit performs controls such that the voltage division ratio of the first voltage-dividing circuit is equal to the voltage division ratio of the second voltage-dividing circuit in a state in which a negative voltage is not applied.

(15)

The light receiving device according to (14), further including a negative voltage generating circuit that generates a negative voltage and applies, in a light receiving state, the generated negative voltage to the terminal to which the negative voltage is to be applied, wherein
the error determination circuit outputs the error signal if a voltage obtained by dividing the power supply voltage and the voltage generated by the negative voltage generating circuit does not fall within a predetermined voltage range.

(16)

A light receiving device including:
the negative voltage monitoring circuit according to (10); and
a second voltage-dividing circuit that divides a potential difference between the power supply voltage and a terminal to which a negative voltage is to be applied and outputs a second voltage, wherein
the negative voltage monitoring circuit performs controls such that the voltage division ratio of the first voltage-dividing circuit is equal to the voltage division ratio of the second voltage-dividing circuit in a state in which a negative voltage is not applied.

(17)

The light receiving device according to (16), further including a negative voltage generating circuit that generates a negative voltage and applies, in a light receiving state, the generated negative voltage to the terminal to which the negative voltage is to be applied, wherein
the error determination circuit outputs the error signal if a voltage obtained by dividing the power supply voltage and the voltage generated by the negative voltage generating circuit does not fall within a predetermined voltage range.

The aspects of the present disclosure are not limited to the embodiments described above and include various modifications that are conceivable, and effects of the present disclosure are not limited to the above-described content. Constituent elements of the embodiments may be appropriately combined for an application. In other words, various additions, changes, and partial deletions can be performed in a range not departing from the conceptual idea and spirit of the present disclosure derived from contents specified in the claims and equivalents thereof.

REFERENCE SIGNS LIST

1: Light receiving device
10: Negative voltage monitoring circuit
100: First voltage-dividing circuit
102: First amplifier circuit
104: Second amplifier circuit
106: ADC
108: Error determination circuit
110: Second voltage-dividing circuit
112: Voltage-division-ratio control circuit
114: 1-bit ADC
20: Negative voltage generating circuit
30: Light receiving element
32: Pixel circuit
34: First substrate
340: Pad
342: Light receiving pixel array
36: Second substrate
360: Pad
362: Pixel circuit array
364: Failure detection circuit
366: Temperature
368: Signal processing circuit
40: Substrate
42: First substrate
44: Second substrate 400: Pixel region
402: Control circuit
404: Logic circuit

The invention claimed is:
1. A negative voltage monitoring circuit comprising:
a first voltage-dividing circuit that divides a power supply voltage and outputs a first voltage;
a first amplifier circuit configured such that the first voltage is inputted to a noninverting input terminal and an output voltage is subjected to negative feedback;
a second amplifier circuit configured such that a second voltage is inputted to the noninverting input terminal, the second voltage being obtained by dividing a potential difference between the power supply voltage and a voltage to be monitored, the voltage being applied to an anode of a light receiving element, and an output voltage is subjected to negative feedback; and
an error determination circuit that outputs an error signal on a basis of a difference between an output of the first amplifier circuit and an output of the second amplifier circuit.
2. The negative voltage monitoring circuit according to claim 1, wherein the light receiving element is a SPAD (Single Photon Avalanche Diode).
3. The negative voltage monitoring circuit according to claim 1, wherein a negative voltage is applied to the anode of the light receiving element in a light receiving state.
4. The negative voltage monitoring circuit according to claim 3, further comprising an error detection circuit that acquires a potential difference between the first amplifier circuit and the second amplifier circuit in a state in which a negative voltage is not applied to the anode of the light receiving element.
5. The negative voltage monitoring circuit according to claim 4, further comprising a voltage-division-ratio control circuit that controls a voltage division ratio of the first voltage-dividing circuit on a basis of an output of the error detection circuit.
6. The negative voltage monitoring circuit according to claim 5, wherein the voltage-division-ratio control circuit outputs a signal including information about the controlled voltage division ratio to the error determination circuit.
7. The negative voltage monitoring circuit according to claim 6, wherein the error determination circuit compares a voltage obtained by amplifying, by an amplification factor of the first amplifier circuit, a voltage determined by dividing the power supply voltage according to the voltage division ratio controlled by the voltage-division-ratio control circuit and a voltage obtained by amplifying, by an amplification factor of the second amplifier circuit, a voltage determined by dividing the power supply voltage and a predetermined negative voltage, and makes an error determination.
8. The negative voltage monitoring circuit according to claim 5, wherein the error detection circuit outputs binary information obtained by comparing an output of the first amplifier circuit and an output of the second amplifier circuit, and the voltage-division-ratio control circuit controls the voltage division ratio on a basis of the binary information.
9. The negative voltage monitoring circuit according to claim 8, wherein the voltage-division-ratio control circuit controls a resistance value of the first voltage-dividing circuit to control the voltage division ratio.
10. A light receiving device comprising:
the negative voltage monitoring circuit according to claim 8; and
a second voltage dividing circuit that divides a potential difference between the power supply voltage and a terminal to which a negative voltage is to be applied and outputs a second voltage, wherein
the negative voltage monitoring circuit performs control such that the voltage division ratio of the first voltage-dividing circuit is equal to a voltage division ratio of the second voltage-dividing circuit in a state in which a negative voltage is not applied.
11. The light receiving device according to claim 10, further comprising a negative voltage generating circuit that generates a negative voltage and applies, in a light receiving state, the generated negative voltage to the terminal to which the negative voltage is to be applied, wherein
the error determination circuit outputs the error signal if a voltage obtained by dividing the power supply voltage and the voltage generated by the negative voltage generating circuit does not fall within a predetermined voltage range.
12. The negative voltage monitoring circuit according to claim 5, wherein the error detection circuit outputs binary information obtained by comparing a result of converting an output of the first amplifier circuit into a digital signal and a result of converting an output of the second amplifier circuit into a digital signal, and the voltage-division-ratio control circuit controls the voltage division ratio on a basis of the binary information.
13. The negative voltage monitoring circuit according to claim 12, wherein the voltage-division-ratio control circuit controls a resistance value of the first voltage-dividing circuit to control the voltage division ratio.
14. A light receiving device comprising:
the negative voltage monitoring circuit according to claim 12; and
a second voltage dividing circuit that divides a potential difference between the power supply voltage and a terminal to which a negative voltage is to be applied and outputs a second voltage, wherein
the negative voltage monitoring circuit performs control such that the voltage division ratio of the first voltage-dividing circuit is equal to a voltage division ratio of the second voltage-dividing circuit in a state in which a negative voltage is not applied.
15. The light receiving device according to claim 14, further comprising a negative voltage generating circuit that generates a negative voltage and applies, in a light receiving state, the generated negative voltage to the terminal to which the negative voltage is to be applied, wherein
the error determination circuit outputs the error signal if a voltage obtained by dividing the power supply voltage and the voltage generated by the negative voltage generating circuit does not fall within a predetermined voltage range.
16. The negative voltage monitoring circuit according to claim 1, further comprising a second voltage-dividing circuit that divides a potential difference between the power supply voltage and the voltage to be monitored and outputs the second voltage.
17. The negative voltage monitoring circuit according to claim 1, wherein two systems of the first voltage-dividing circuit, the first amplifier circuit, and the second amplifier circuit are provided.

* * * * *